United States Patent
Engelland et al.

(10) Patent No.: US 8,808,417 B2
(45) Date of Patent: Aug. 19, 2014

(54) AIR CLEANER ARRANGEMENTS; SERVICEABLE FILTER ELEMENTS; AND, METHODS

(71) Applicant: Donaldson Company, Inc., Minneapolis, MN (US)

(72) Inventors: Randall Allen Engelland, Farmington, MN (US); Thomas Richard Olson, Prior Lake, MN (US); Gary Ray Gillingham, Prior Lake, MN (US); Jim C. Rothman, Burnsville, MN (US); Richard Lawrence Suydam, River Falls, WI (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/776,400

(22) Filed: Feb. 25, 2013

(65) Prior Publication Data
US 2013/0167491 A1 Jul. 4, 2013

Related U.S. Application Data

(63) Continuation of application No. 13/434,149, filed on Mar. 29, 2012, now Pat. No. 8,382,875, which is a continuation of application No. 12/020,100, filed on Jan. 25, 2008, now Pat. No. 8,147,582, which is a continuation of application No. 10/776,662, filed on Feb. 10, 2004, now Pat. No. 7,323,029.

(60) Provisional application No. 60/446,804, filed on Feb. 11, 2003, provisional application No. 60/457,255, filed on Mar. 25, 2003.

(51) Int. Cl.
*B01D 39/00* (2006.01)

(52) U.S. Cl.
USPC .............. 55/502; 55/385.3; 55/480; 55/497; 55/499; 55/501

(58) Field of Classification Search
USPC ........ 55/357, 385.3, 480–481, 432, 491–493, 55/498–499, 502–507, 521, 523; 123/198 E; 95/92, 210
See application file for complete search history.

(56) References Cited

U.S. PATENT DOCUMENTS 2,887,177 A 5/1959 Mund et al.
3,025,963 A 3/1962 Bauer
(Continued)

FOREIGN PATENT DOCUMENTS

DE 102 22 800 A1 12/2003
EP 0 391 019 1/1990
(Continued)

OTHER PUBLICATIONS

Complaint with Exhibits A-F; *Donaldson Company, Inc. v. Mann+Hummel USA, Inc. and Mann+Hummel GmbH*, United States District Court District of Minnesota, Case 0:07-cv-04136 MJD-SRN filed Oct. 1, 2007.

(Continued)

*Primary Examiner* — Jason M Greene
*Assistant Examiner* — Karla Hawkins
(74) *Attorney, Agent, or Firm* — Merchant & Gould, P.C.

(57) ABSTRACT

An air cleaner arrangement or assembly is provided. The air cleaner arrangement includes a serviceable filter cartridge. The air cleaner assembly also includes an arrangement for positioning the filter cartridge into a preferred, sealing, orientation and for securing the filter cartridge in that location. Preferred serviceable filter cartridges are provided, as well as methods of assembly and use.

30 Claims, 27 Drawing Sheets

(56) References Cited

U.S. PATENT DOCUMENTS

| | | |
|---|---|---|
| 3,209,917 A | 10/1965 | Yelinek |
| 3,215,403 A | 11/1965 | Bauder |
| 3,676,242 A | 7/1972 | Prentice |
| 3,695,437 A | 10/1972 | Shaltis |
| 3,807,150 A | 4/1974 | Maracle |
| 3,841,953 A | 10/1974 | Kohkamp et al. |
| 3,849,241 A | 11/1974 | Butin et al. |
| 3,878,014 A | 4/1975 | Melead |
| 4,065,341 A | 12/1977 | Cub |
| 4,158,449 A | 6/1979 | Sun et al. |
| 4,159,899 A | 7/1979 | Deschenes |
| 4,162,906 A | 7/1979 | Sullivan et al. |
| 4,282,186 A | 8/1981 | Nonnenmann et al. |
| 4,285,909 A | 8/1981 | Mizusawa et al. |
| 4,322,231 A | 3/1982 | Hilzendeger et al. |
| 4,402,830 A | 9/1983 | Pall |
| 4,430,223 A | 2/1984 | Miyakawa et al. |
| 4,449,993 A | 5/1984 | Bergeron |
| 4,537,608 A | 8/1985 | Koslow |
| 4,617,176 A | 10/1986 | Merry |
| 4,720,292 A | 1/1988 | Engel et al. |
| 4,925,469 A | 5/1990 | Clement et al. |
| 4,925,561 A | 5/1990 | Ishii et al. |
| 4,963,170 A | 10/1990 | Weber et al. |
| 5,030,264 A | 7/1991 | Klotz et al. |
| 5,125,941 A | 6/1992 | Ernst et al. |
| 5,213,596 A | 5/1993 | Kume et al. |
| 5,304,312 A | 4/1994 | Forster et al. |
| 5,350,515 A | 9/1994 | Stark et al. |
| 5,415,677 A | 5/1995 | Ager et al. |
| 5,435,870 A | 7/1995 | Takagaki et al. |
| 5,484,466 A | 1/1996 | Brown et al. |
| 5,487,767 A | 1/1996 | Brown |
| 5,494,497 A | 2/1996 | Lee |
| 5,543,007 A | 8/1996 | Takagaki et al. |
| 5,547,480 A | 8/1996 | Coulonvaux |
| 5,611,922 A | 3/1997 | Stene |
| 5,613,992 A | 3/1997 | Engel |
| 5,645,718 A | 7/1997 | Hardison et al. |
| 5,683,660 A | 11/1997 | Wirth et al. |
| 5,685,985 A | 11/1997 | Brown et al. |
| 5,714,126 A | 2/1998 | Frund |
| 5,730,766 A | 3/1998 | Clements |
| 5,730,768 A | 3/1998 | Kaminaga et al. |
| 5,740,774 A | 4/1998 | Kennedy |
| 5,755,843 A | 5/1998 | Sundquist |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| 5,820,646 A | 10/1998 | Gillingham et al. |
| 5,863,313 A | 1/1999 | Coulonvaux |
| 5,897,676 A | 4/1999 | Engel et al. |
| 5,902,364 A | 5/1999 | Tokar et al. |
| D417,268 S | 11/1999 | Gillingham |
| 6,048,386 A | 4/2000 | Gillingham et al. |
| D425,189 S | 5/2000 | Gillingham et al. |
| 6,149,700 A | 11/2000 | Morgan et al. |
| 6,179,890 B1 | 1/2001 | Ramos et al. |
| 6,190,432 B1 | 2/2001 | Gieseke et al. |
| 6,231,630 B1 | 5/2001 | Ernst et al. |
| 6,235,195 B1 | 5/2001 | Tokar |
| 6,299,661 B1 | 10/2001 | Bloomer |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| 6,416,561 B1 | 7/2002 | Kallsen et al. |
| 6,517,598 B2 | 2/2003 | Anderson et al. |
| 6,585,792 B2 | 7/2003 | Schneider et al. |
| 6,598,580 B2 | 7/2003 | Baumann et al. |
| 6,610,117 B2 | 8/2003 | Gieseke et al. |
| 6,610,126 B2 | 8/2003 | Xu et al. |
| D483,459 S | 12/2003 | DeWit et al. |
| 7,004,986 B2 | 2/2006 | Kopec et al. |
| 7,323,029 B2 | 1/2008 | Engelland et al. |
| 8,012,233 B2 * | 9/2011 | Kuempel et al. ............... 55/521 |
| 8,048,188 B2 | 11/2011 | Widerski et al. |
| 8,147,582 B2 | 4/2012 | Engelland et al. |
| 8,382,876 B2 * | 2/2013 | Widerski et al. ............... 55/521 |
| 2002/0112458 A1 | 8/2002 | Schneider et al. |
| 2002/0184864 A1 | 12/2002 | Bishop et al. |
| 2002/0185007 A1 | 12/2002 | Xu et al. |
| 2004/0020177 A1 | 2/2004 | Ota et al. |
| 2005/0229561 A1 | 10/2005 | Nepsund et al. |

FOREIGN PATENT DOCUMENTS

| | | |
|---|---|---|
| EP | 0 376 443 B1 | 7/1990 |
| EP | 0 486 276 B1 | 5/1992 |
| EP | 0 492 250 A1 | 7/1992 |
| EP | 0 529 921 B1 | 3/1993 |
| EP | 0 581 695 B1 | 2/1994 |
| EP | 0 704 233 B1 | 4/1996 |
| EP | 1 364 695 A1 | 11/2003 |
| FR | 2 034 160 | 12/1970 |
| GB | 703823 | 2/1954 |
| GB | 1 275 651 | 5/1972 |
| JP | 58-151417 | 3/1982 |
| JP | 60-155921 | 3/1984 |
| JP | 60-112320 | 7/1985 |
| JP | 02-48117 | 9/1988 |
| JP | 02-48118 | 9/1988 |
| JP | A S63-235656 | 9/1988 |
| JP | 1-11971 | 4/1989 |
| JP | 1-171615 | 7/1989 |
| JP | U H01-163408 | 11/1989 |
| JP | U H03-032923 | 2/1991 |
| JP | 04-23457 | 3/1992 |
| JP | A H08-121272 | 5/1996 |
| JP | A H09-234321 | 9/1997 |
| JP | A H11-508180 | 7/1999 |
| JP | A 2002-174150 | 6/2002 |
| WO | WO 97/00113 | 1/1997 |
| WO | WO 97/40908 | 11/1997 |
| WO | WO 97/40910 | 11/1997 |
| WO | WO 97/40918 | 11/1997 |
| WO | WO 97/41939 | 11/1997 |
| WO | WO 97/45200 | 12/1997 |
| WO | WO 98/35144 | 8/1998 |
| WO | WO 99/37381 | 7/1999 |
| WO | WO 00/74818 A1 | 12/2000 |
| WO | WO 02/098539 A2 | 12/2002 |
| WO | WO 03/084641 A2 | 10/2003 |
| WO | WO 03/095068 A1 | 11/2003 |
| WO | WO 2004/007054 A1 | 1/2004 |
| WO | WO 2004/020075 A2 | 3/2004 |

OTHER PUBLICATIONS

Notice of Claims Involving Patents; *Donaldson Company, Inc.* v. *Mann+Hummel USA, Inc. and Mann+Hummel GmbH*, United States District Court District of Minnesota, Case 0:07-cv-04136 MJD-SRN filed Oct. 1, 2007.

Rule 7.1 Disclosure Statement of Plaintiff Donaldson Company, Inc.; *Donaldson Company, Inc.* v. *Mann+Hummel USA, Inc. and Mann+Hummel GmbH*, United States District Court District of Minnesota, Case 0:07-cv-04136 MJD-SRN filed Oct. 1, 2007.

Civil Cover Sheet; *Donaldson Company, Inc.* v. *Mann+Hummel USA, Inc. and Mann+Hummel GmbH*, United States District Court District of Minnesota, Case 0:07-cv-04136 MJD-SRN filed Oct. 1, 2007.

(56) References Cited

OTHER PUBLICATIONS

International Search Report for PCT/US2004/003950.
Written Opinion for PCT/US2004/003950.
European Search Report for European Application No. 10160496 dated Jun. 29, 2010.
European Search Report for European Application No. 10182613 dated Nov. 19, 2010.
Statement Regarding Product dated Dec. 23, 2010 (7 pages).
Statement Regarding Product dated Dec. 23, 2010 (10 pages).
Japanese Office Action dated Feb. 24, 2014 for Japanese Application No. 2013-018941.
Japanese Office Action dated Dec. 16, 2013 for Japanese Application No. 2012-072243.

* cited by examiner

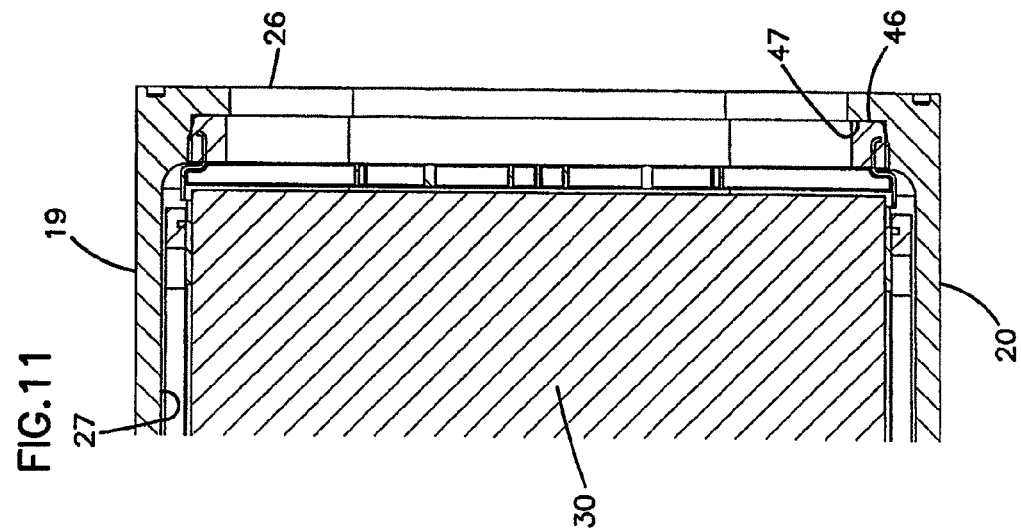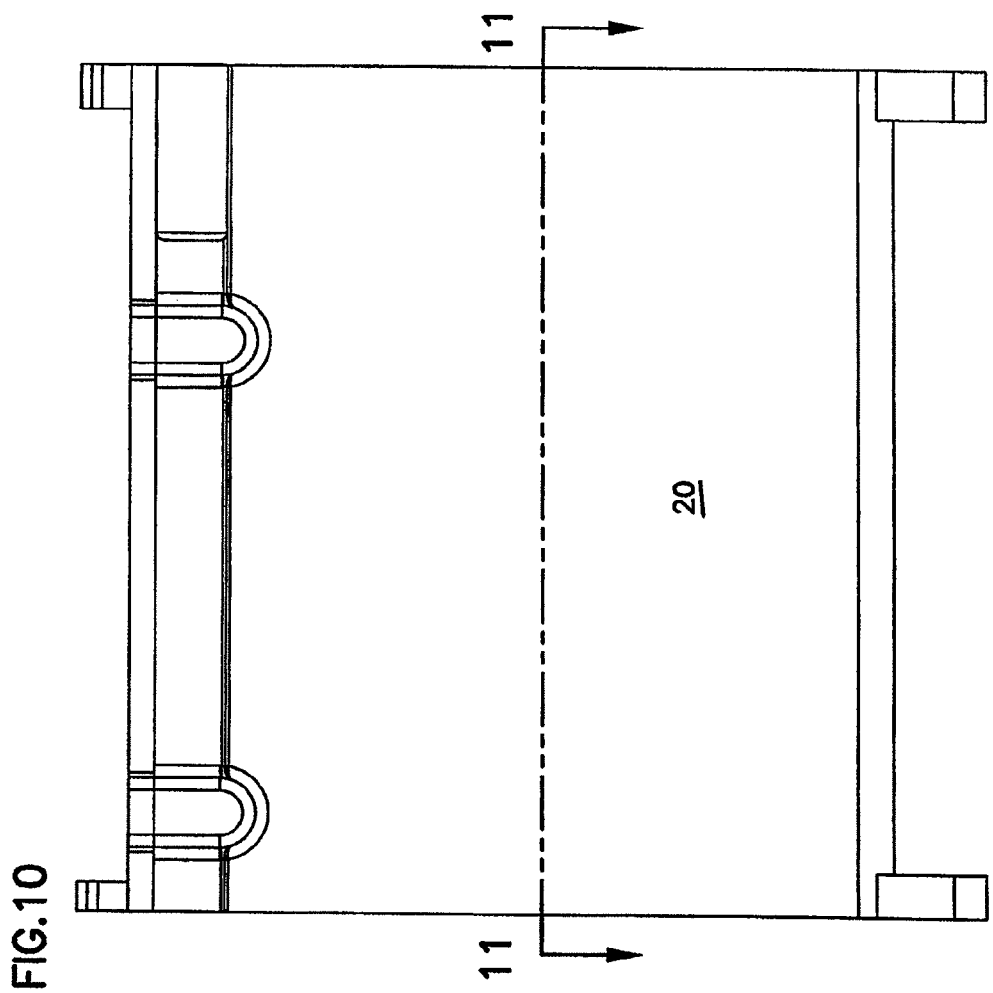

AIR CLEANER ARRANGEMENTS; SERVICEABLE FILTER ELEMENTS; AND, METHODS

CROSS-REFERENCE TO RELATED APPLICATIONS

The present application is a continuation of application Ser. No. 13/434,149, filed Mar. 29, 2012, which is a continuation of application Ser. No. 12/020,100, filed Jan. 25, 2008, now U.S. Pat. No. 8,147,582, which is a continuation of application Ser. No. 10/776,662, filed Feb. 10, 2004, now U.S. Pat. No. 7,323,029, which application claims benefit of provisional application Ser. No. 60/446,804, filed Feb. 11, 2003 and Ser. No. 60/457,255, filed Mar. 25, 2003. U.S. application Ser. Nos. 13/434,149, 12/020,100, 10/776,662, 60/446,804, and 60/457,255 are incorporated herein by reference in their entirety.

TECHNICAL FIELD

This disclosure relates to air cleaners and to components for air cleaners. This disclosure particularly concerns air cleaners of a type useable for cleaning intake air for engines. Methods of assembly and use are also provided.

BACKGROUND

Air cleaners are needed for a variety of applications, for example to provide cleaning of engine intake air for internal combustion engines. A wide variety of types of air cleaner arrangements and filter materials are known.

One known filter material, is filter media configured in a z-arrangement. Z-filter media generally comprises a corrugated or pleated media sheet secured to a non-corrugated (facing) sheet. The media is arranged to form a set of longitudinal flutes or air flow channels on one side of the corrugated or fluted media, and another set of flow channels on an opposite side of the fluted media. In operation, flutes of one set of flutes are designated as inlet flutes, are left open at an inlet end or side of the media, and are sealed or otherwise folded closed at an outlet end or side of the media. Analogously, the flutes of a second set of flutes are generally designated as outlet flutes, are sealed or otherwise closed at the outlet end or side of the filter, and are left open at the outlet end or side of the filter. In operation, air passes into one flow face of the air filter construction, by passage into the open inlet flutes at an upstream end of the element. The air cannot flow out of the closed ends of these inlet flutes, so it must pass through the filter media into the outlet flutes. The filtered air then passes outwardly from an exit end of the filter element, through the open ends of the outlet flutes.

A variety of z-filter constructions are known; including, for example, the ones described in U.S. Pat. Nos. 5,820,646; 5,792,247; 6,190,432; and, 6,350,291; PCT Publication WO 97/40918; U.S. provisional application 60/395,009 filed 10 Jul. 2002; and the PCT Application US 03/02799 filed Jan. 31, 2003 and claiming priority from U.S. Provisional 60/395,009; the complete disclosures of all seven references above being incorporated herein by reference. These types of media (among others) can be used in arrangements of the types described herein.

Z-filter media has been characterized as useable in coiled configurations, see for example U.S. Pat. No. 6,350,291; or in stacks of sheets of Z-filter media, see for example FIG. 26 of U.S. Pat. No. 5,820,646.

The current disclosure concerns certain preferred arrangements for utilization of Z-filter media constructions.

SUMMARY OF THE DISCLOSURE

In the present disclosure, unique features of air filter cartridge arrangements are described and shown. In addition, unique housing arrangement features, for receiving and mounting the filter cartridge arrangements are provided.

With the various features shown and described, or selected combinations of them, unique and convenient filter cartridges and air cleaner assemblies can be made.

The disclosure also concerns methods of installing air filter cartridges, and methods of removing them. In addition, from the descriptions provided, methods of assembling preferred filter cartridges and preferred air cleaner assemblies will be apparent.

BRIEF DESCRIPTION OF THE DRAWINGS

FIG. 10 is a schematic side elevational view of the arrangement shown in FIG. 2.

FIG. 11 is a schematic, fragmentary, cross-sectional view taken along line 11-11, FIG. 10.

in FIG. 27A, a seal structure for use with the element of FIG. 28 is depicted installed.

DETAILED DESCRIPTION

I. FIGS. 1-25

The present disclosure concerns certain air cleaners having a straight through flow design. By straight through flow design, it is meant that air enters a serviceable filter cartridge within the air cleaner, along one (inlet) face, and filtered air exits the filter cartridge from an opposite, second (outlet) face. That is, the inlet and outlet flow paths for the serviceable filter cartridge are generally in the same direction.

Air cleaners of the type concern that the present disclosure, include serviceable filter elements or cartridges. The term "serviceable filter element or cartridge", and variants thereof, in this context, is meant to refer to a filter element or cartridge that can be removed from the remainder of the air cleaner and be replaced therein. Typically the filter cartridge of an air cleaner for intake air of combustion engines needs to be serviceable, since periodically the filter cartridge will become occluded, and must be removed and be replaced.

Air cleaners and serviceable filter cartridges of the general type characterized herein, can be used in a variety of arrangements. Typical applications include as air cleaners for internal combustion engines. The air cleaner assemblies and cartridges can be sized and configured for a wide variety of engine applications. Herein, a particular application, involving a large diesel engine having a turbocharger upstream of the air cleaner assembly is described, as an example. However, the principles disclosed herein can be applied in a wide variety of alternate applications.

Figure 1:
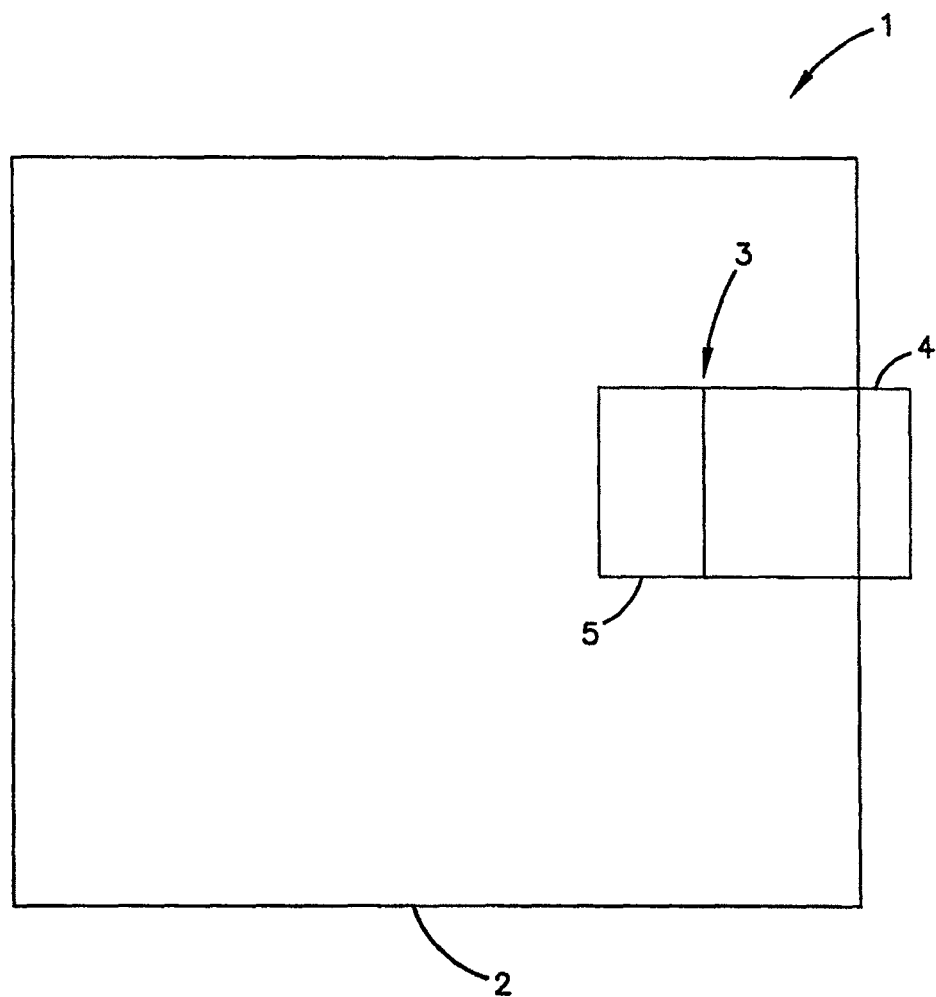
FIG. 1 is a schematic diagram of an engine system including an air cleaner according to the present disclosure.

The reference numeral 1, FIG. 1, generally indicates an engine system. The engine system 1 includes an internal combustion engine 2, such as a diesel engine, with an air intake system 3, including, among other things, a turbocharger and aftercooler arrangement 4 and an air cleaner or air cleaner assembly 5. For the particular arrangement shown, the turbocharger and aftercooler arrangement 4 is positioned upstream of the air cleaner 5. Thus, after passage through the turbocharger and aftercooler 4, air is forced through the air cleaner 5 and into the air intake for the diesel engine 2. Large diesel engines rated at up to 750-horse power used with military vehicles, would be some typical examples of such an arrangement.

Figure 2:
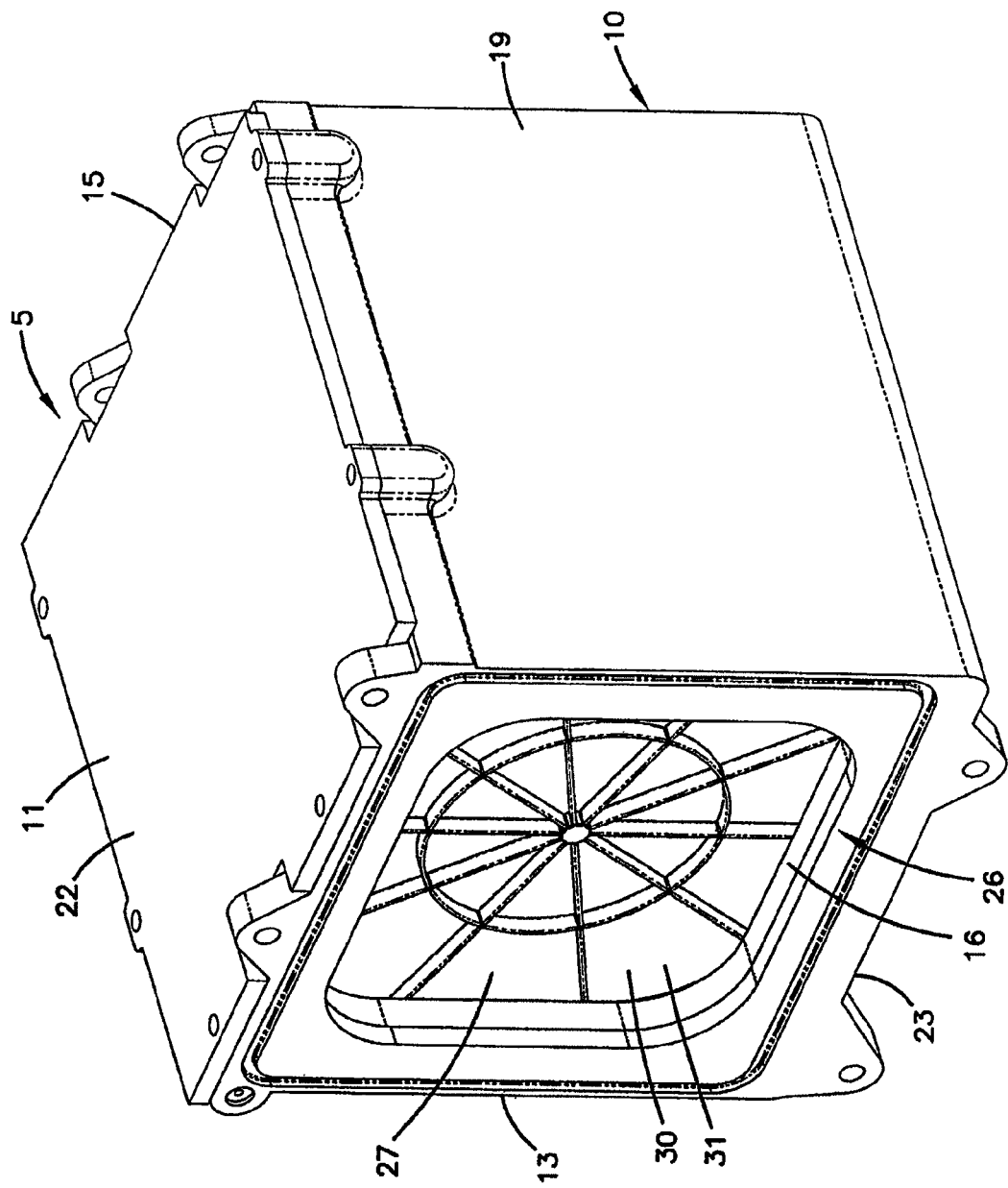
FIG. 2 is an outlet end perspective view of an air cleaner arrangement according to the present disclosure.
Figure 3:
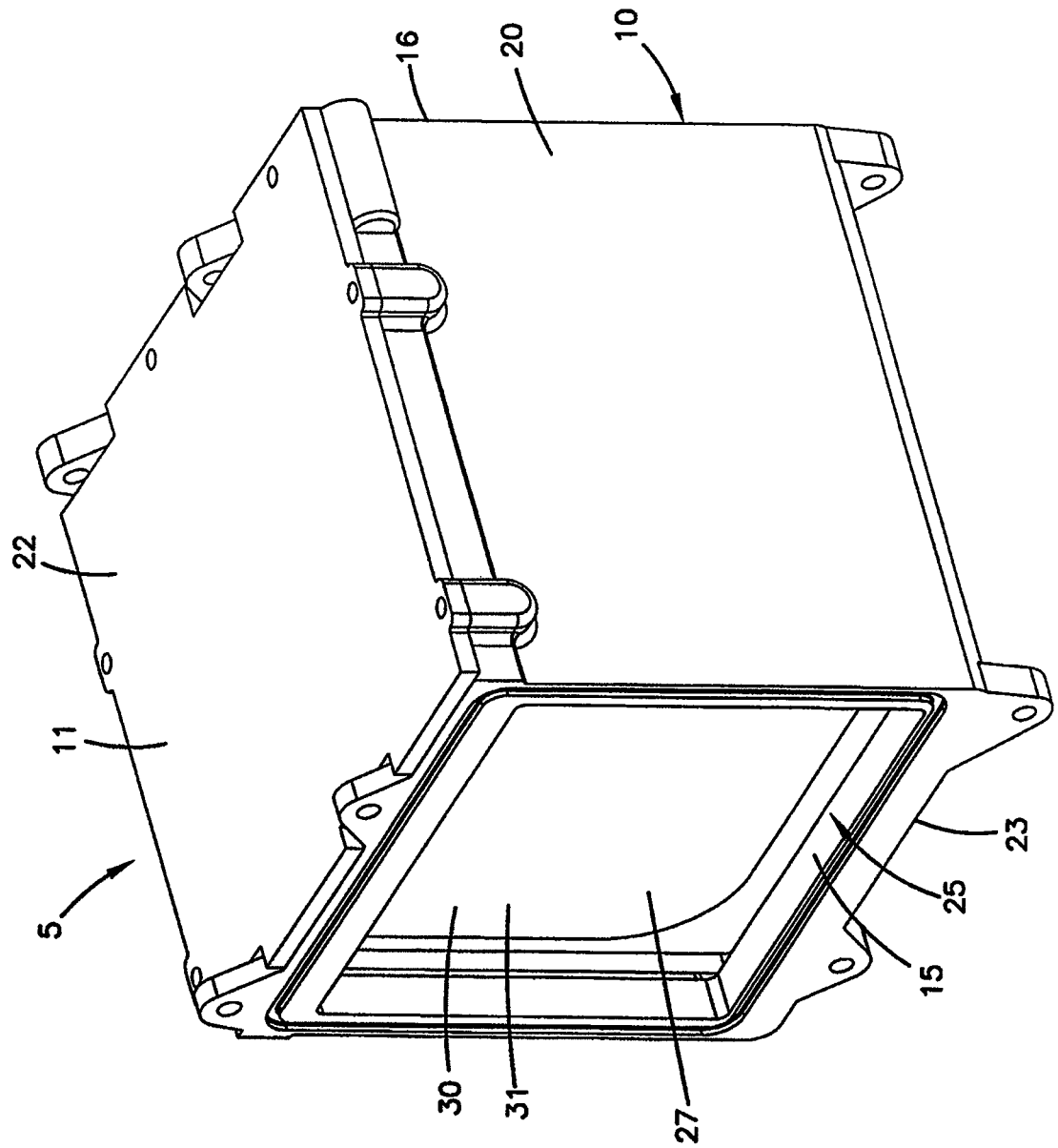
FIG. 3 is an inlet end perspective view of the air cleaner arrangement shown in FIG. 2.
Figure 4:
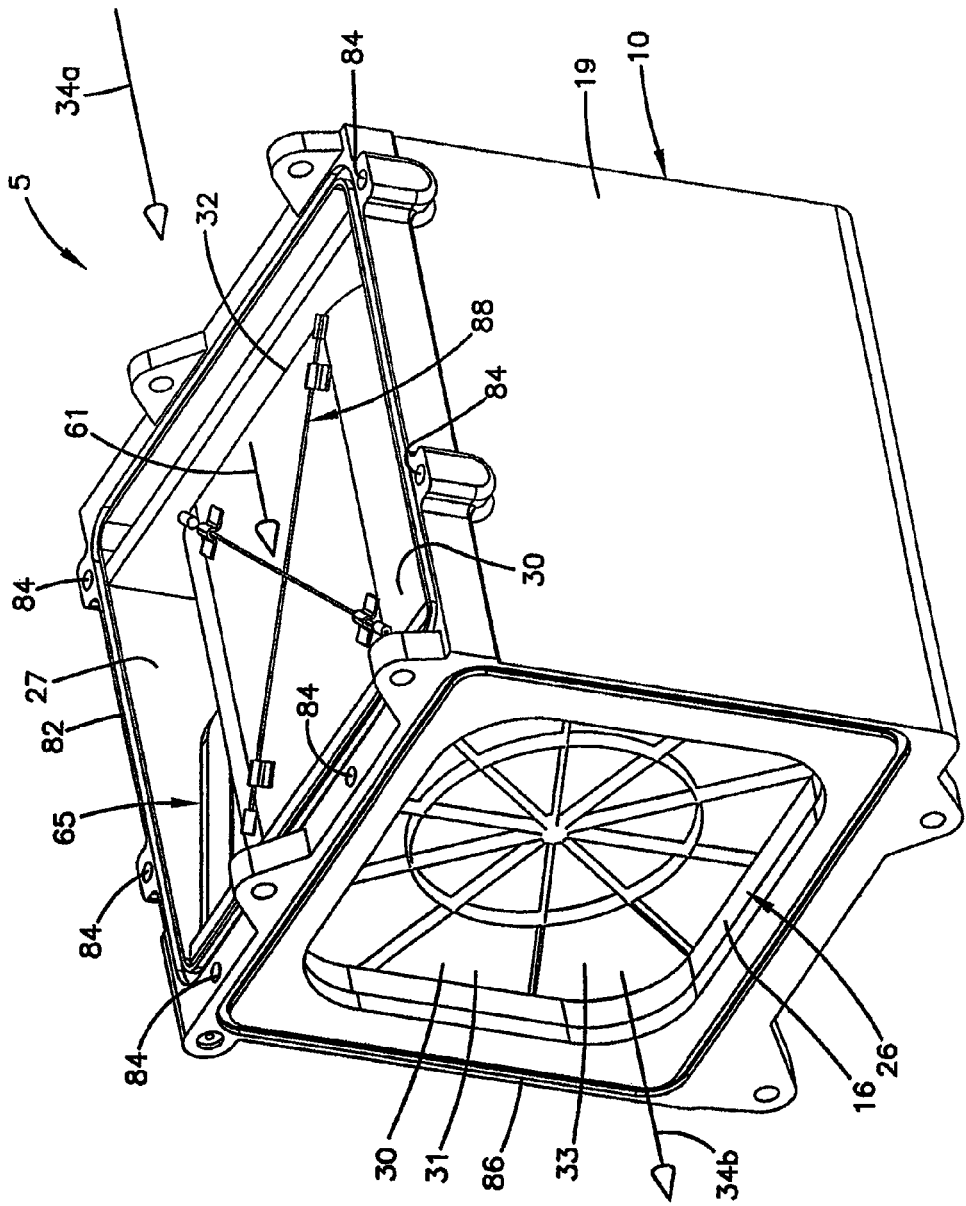
FIG. 4 is an outlet end perspective view analogous to FIG. 2, but showing the air cleaner with a top access cover removed.
Figure 5:
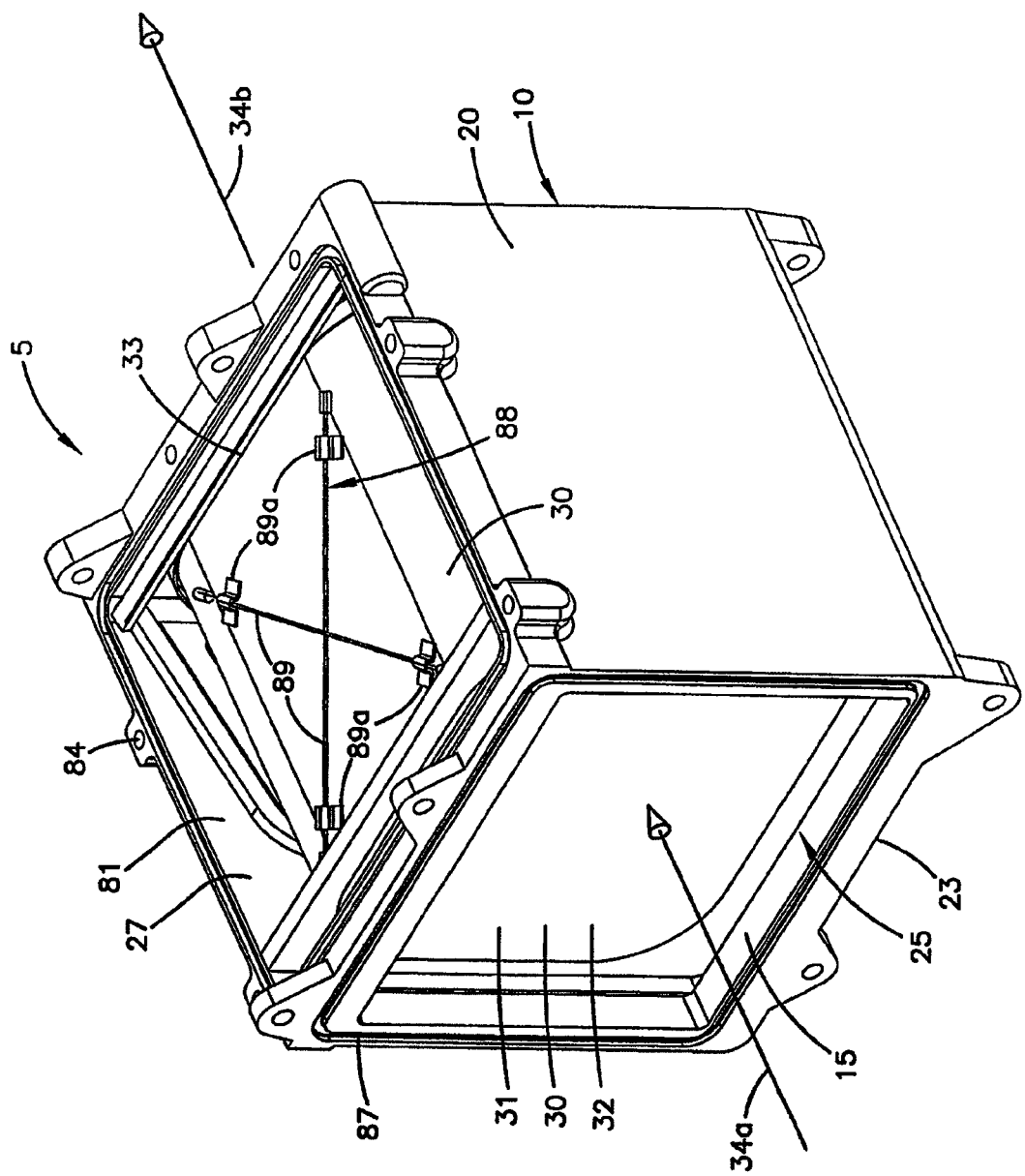
FIG. 5 is an inlet end perspective view analogous to FIG. 3, but showing the air cleaner with the top access cover removed.
Figure 6:
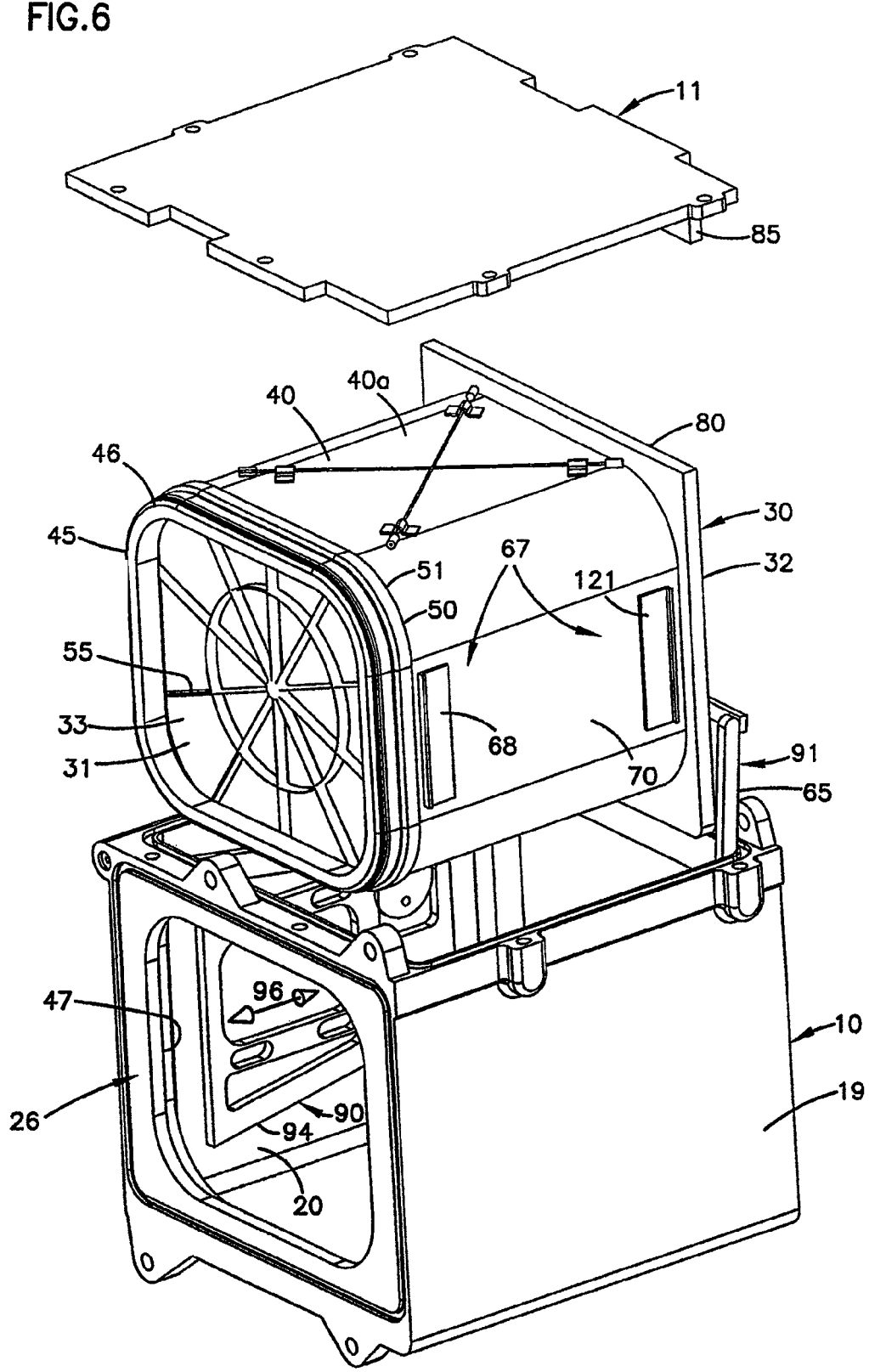
FIG. 6 is an outlet end exploded perspective view of an air cleaner arrangement according to FIG. 2 depicted with a top access cover lifted off and a serviceable filter cartridge lifted out of the housing; the housing being shown with an operator handle in an upper or non-locked orientation.
Figure 7:
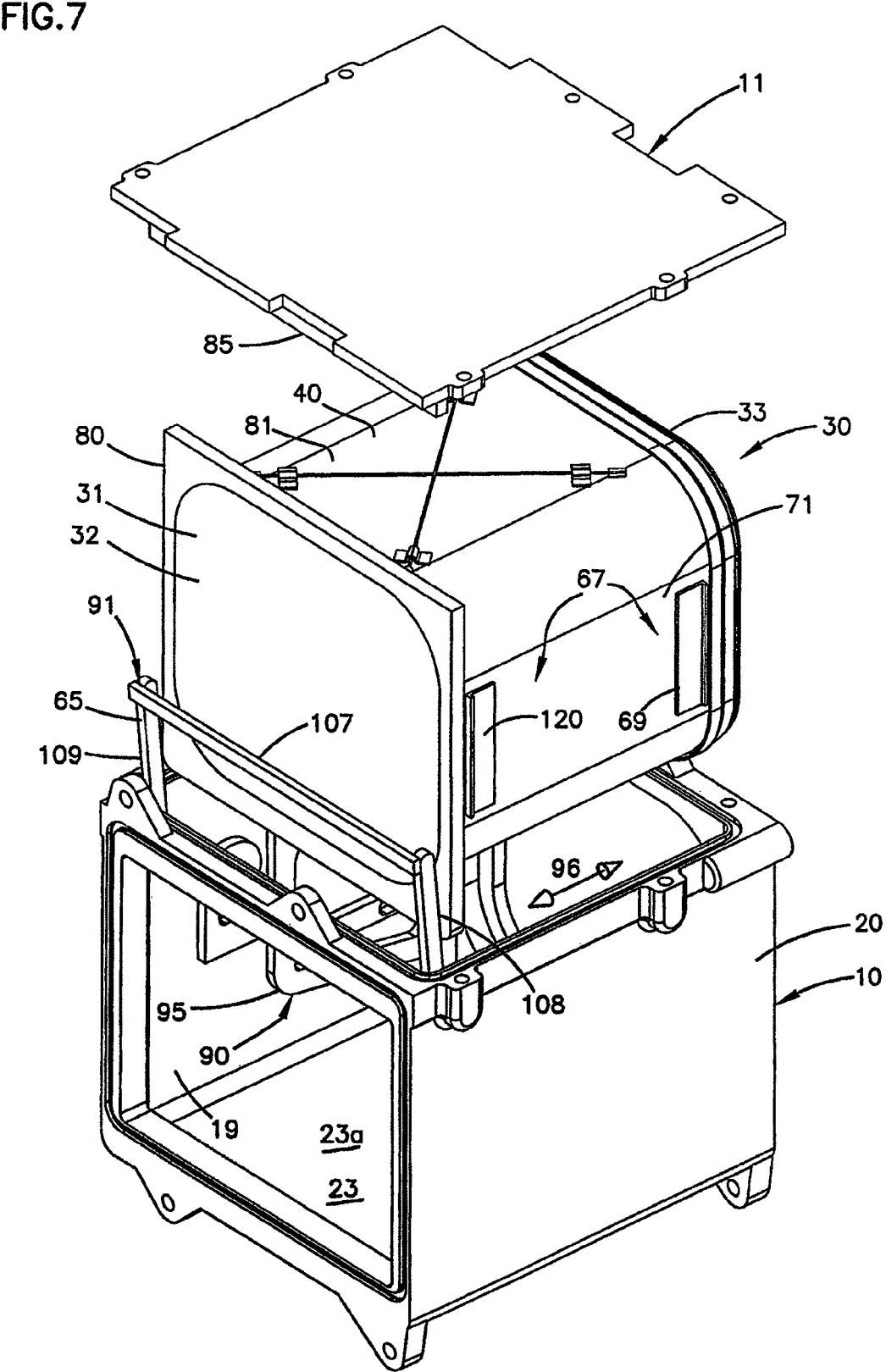
FIG. 7 is an inlet end perspective view analogous to FIG. 6.

In FIG. 2, an air cleaner assembly 5 according to the present disclosure is provided in perspective view. The orientation of the assembly in FIG. 2, is such that the viewer can see an exit or outlet end of the air cleaner, and an adjacent side. In FIG. 3, a perspective view analogous to FIG. 2 is shown, but from a perspective rotated 180° around a vertical axis for the air cleaner. In FIG. 4, the air cleaner is depicted from a view analogous to FIG. 2 but with top access cover or access panel removed. FIG. 5 is a view analogous to FIG. 3, but with a top access cover removed. FIG. 6 is a view analogous to FIG. 2, except showing the air cleaner with the access cover removed, an operator handle raised, and a filter cartridge listed out, all in exploded view. FIG. 7 is a view analogous to FIG. 6, but from a perspective rotated 180° around a vertical axis; i.e., a perspective analogous to FIG. 3.

Figure 8:
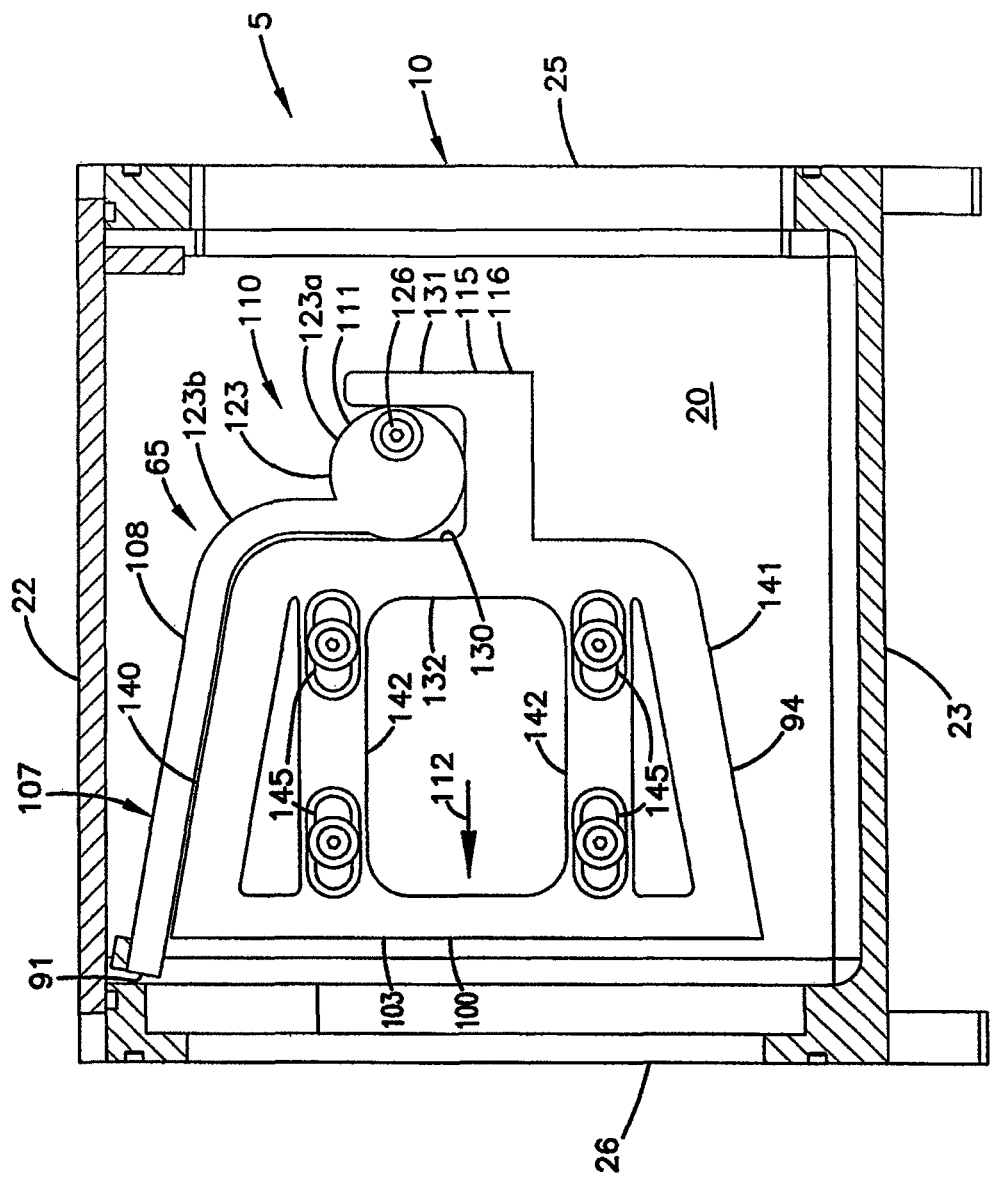
FIG. 8 is a schematic elevational view of an internal wall of the arrangement shown in FIG. 2, with portions indicating biasing and lock assembly positioned therein, in a lowered and locked position.
Figure 9:
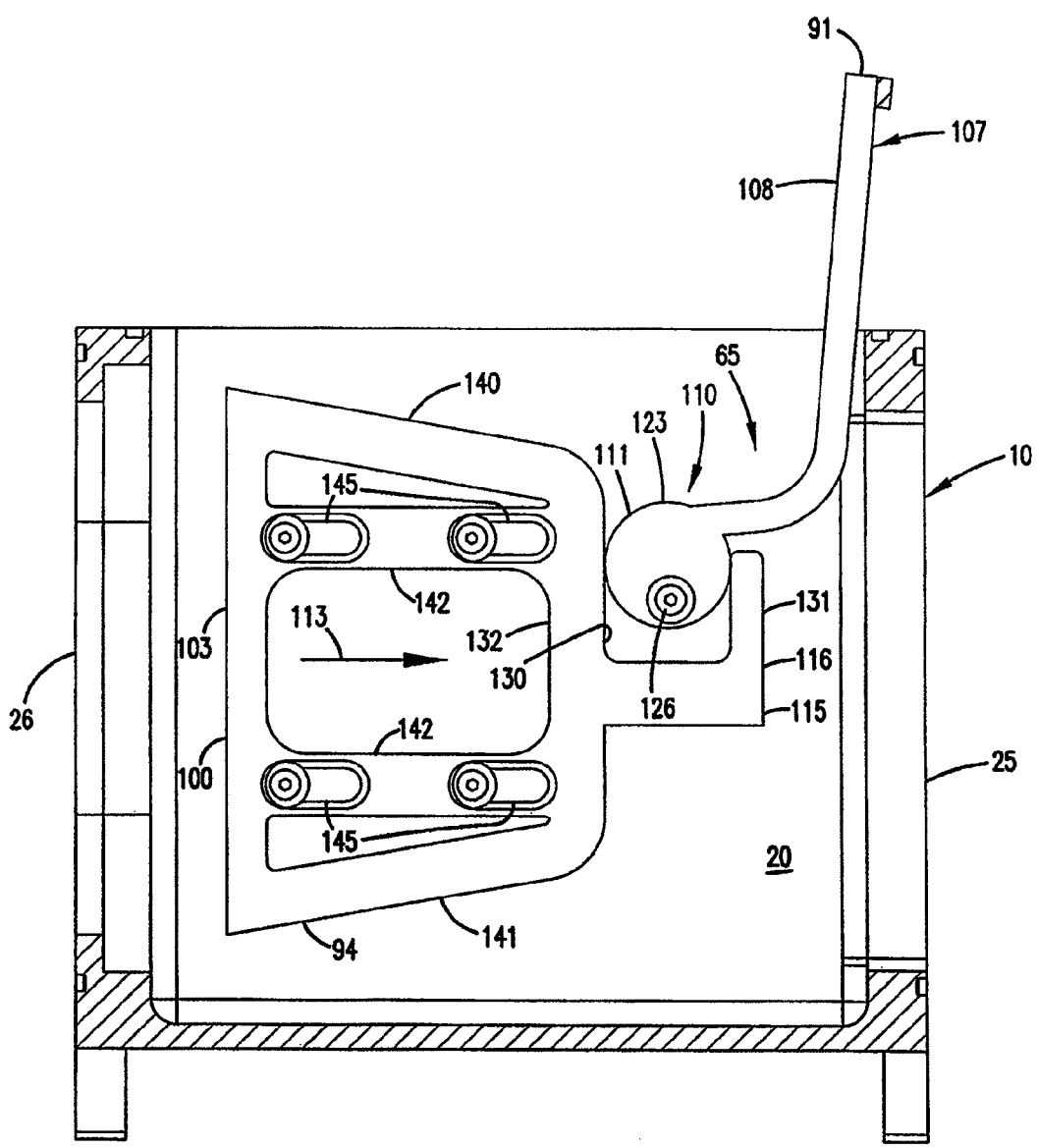
FIG. 9 is a view analogous to FIG. 8, but showing the biasing and lock assembly in a raised, unlocked, position.

FIG. 8 is a schematic view of an inside wall of the air cleaner, showing a biasing and lock mechanism in a closed orientation. FIG. 9 is a view analogous to FIG. 8, except showing a top panel removed and a control member of the biasing and lock mechanism in a raised orientation with a slider member in a non-locking arrangement. FIG. 10 is a schematic side elevational view of the air cleaner of FIG. 2. FIG. 11 is a fragmentary schematic cross-sectional view taken generally along line A-A, FIG. 10.

Referring to FIG. 2, an outer housing 10 for the air cleaner 5 is depicted. The housing 10 is shown with removable service panel or access panel 11 mounted thereon. The housing 10 operates as a duct 13 through which, in use, air to be filtered or cleaned flows. Specifically, air to be filtered enters duct 13 through inlet end or opening 15 and, after passage through an internally received, serviceable, filter cartridge 30, the air exits the duct 13 through opposite outlet end or opening 16. In general, air cleaner operation involves passing the air, as it moves from inlet end or opening 15 to outlet opening 16, through z-filter media 31 contained in the removable and replaceable, i.e. serviceable, filter cartridge 30. The inlet end 15 is more clearly viewable in FIG. 3.

The principles disclosed herein can be applied in a variety of shapes and sizes of housings. The particular housing 10 shown, is meant to be an example only. However, the generally rectangular (in cross-section) configuration depicted is preferred, and the principles disclosed are particularly well adapted for application in a housing of such a preferred configuration. Of course, the preferred configuration shown is, in general, a non-circular configuration.

The particular housing 10 (FIGS. 2 and 3) depicted is generally rectangular in cross-section with side walls defining opposite sides 19, 20, opposite top and bottom panels 22, 23, and opposite inlet and outlet ends 25, 26 respectively. Top 22 generally corresponds to a side wall which is openable by removal of the access or service cover 11. The walls 19, 20, 22, 23, 25 and 26 define an interior 27 of the housing 10, into which serviceable filter cartridge 30 is positioned, in use.

Referring to FIGS. 4 and 5, in which the air cleaner 5 is depicted with the access cover 11 (FIGS. 2 and 3) removed, the filter cartridge 30 includes an air inlet end 32 and an air outlet end 33. The filter cartridge 30 has a straight through flow design, meaning that it has opposite inlet and outlet faces 32, 33, respectively with (in use) air flowing therebetween. That is, the direction of inlet flow (arrow 34a) and the direction of outlet flow (arrow 34b) are generally the same.

Figure 20:
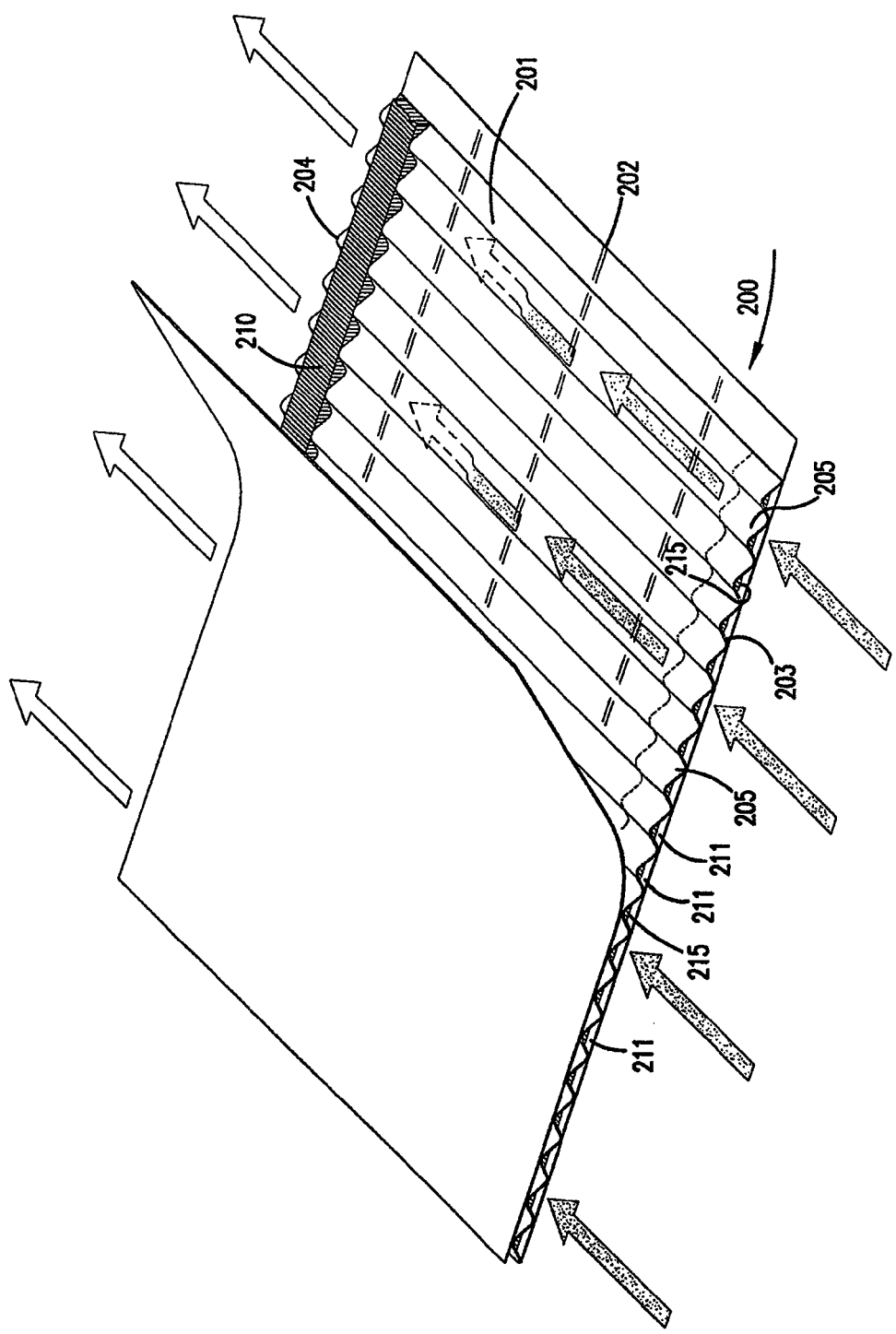
FIG. 20 is a schematic view of z-filter media utilizable in arrangements according to any one of FIGS. 2-19.

The filter cartridge includes filter media 31. The filter media 31 depicted, is of the z-filter type, comprising corrugated or fluted media secured to a non-corrugated (i.e. non-fluted) facing sheet, although alternatives are possible. Such media can be provided in a variety of configurations including: as coiled continuous sheet configurations as shown in FIG. 22; or, as stacked constructions as of individual sheets shown in FIG. 21 and described with respect to FIG. 26 of U.S. Pat. No. 5,820,646 incorporated herein by reference. Either one of these two types of z-filter media arrangements can be used to provide the configuration generally depicted in FIGS. 2-9. Indeed, the drawings of FIGS. 2-9 are schematic and are not meant to necessarily depict any specific arrangement. It is anticipated that in typical use such as FIGS. 2-9, a coiled configuration of z-filter media, similar to FIG. 22, would be preferable. That is, a preferred approach would use a continuous strip of fluted or corrugated media secured to a non-fluted (preferably non-corrugated) facing media, coiled into the rectangular configuration shown. Useable media is depicted in the schematic of FIG. 20, discussed below.

Referring to FIGS. 6 and 7, the filter cartridge 30 comprises an impermeable sheath construction 40 positioned surrounding the media 31. The term "impermeable" in this context, is meant to refer to a sheath construction 40 that comprises a solid, non-permeable, plastic or metal component. That is, while the air can pass from inlet end 32 to exit end 33, and thus through the length of the sheath construction 40 between its open ends, the air cannot pass directly through a side wall 40*a* of sheath construction 40.

The impermeable sheath construction 40 can be provided in a variety of manners and by a variety of constructions. For example, it can comprise a single piece molded plastic or cast metal construction, a multi-piece clamshell construction of plastic or metal components, or a sheet or sheath of material such as aluminum wrapped around the media 31.

Referring to FIG. 6, at air exit end 33, the serviceable filter cartridge 30 includes a first, primary, seal arrangement 45. The first or primary seal arrangement 45 includes a seal member 46 positioned to provide a seal (i.e., a housing seal) upon appropriate engagement with a portion of the housing 10. Typically, the seal member 46 comprises a rubber like material, such as foamed polyurethane. In typical preferred applications, the seal member 46 is configured to engage a sealing portion 47 of the housing 10 at or adjacent outlet end wall 26.

A variety of specific configurations and orientations for the seal member 46 can be used. Typically, the seal member 46 will be mounted upon a seal member support framework 50. The seal member support framework 50 can be integral with a remainder of the sheath construction 40, or it can be a separately formed construction attached to the sheath construction 40. An example of the former would be mounting the seal member 46 on a portion of the impermeable sheath construction itself, for example a flange integral with a remainder of the sheath construction 40. An example of the latter would be mounting the seal member 46 on a frame piece 51 which is itself adhered to, welded to or otherwise secured to, a remainder of the impermeable sheath construction 40.

For the particular embodiment shown, the support framework 50 comprises of frame piece 51 including a rim secured to a remainder of the impermeable sheath construction 40, for example with an adhesive or by welding.

The framework 51 can include, imbedded within the seal member 46, a support, not shown in FIG. 6, to provide appropriate sealing support and orientation for the seal member 46. The support may be, for example, as shown in fragmented, schematic, cross-sectional view in FIG. 23 discussed below.

The seal member 46 can be permanently attached to the framework 50, or it can be removably secured thereto. An example of permanent attachment, would be a molding of the seal member 46, for example from a foamed polyurethane material, directly onto the support framework 50. An example of this is shown in the schematic, cross-section, in FIG. 23. Examples of this are described in U.S. Pat. No. 5,350,291, incorporated herein by reference.

Referring to FIG. 6 cartridge 30 includes, extending across the media 31 at exit in 33, outlet end support lattice 55. The outlet end support lattice 55 generally comprises a set of segments, secured to the support framework 50. For the particular arrangement shown, the segments include the set of spokes extending radially outwardly from center, with ribs extending therebetween. For the particular arrangement shown, ten spokes and a single circular rib arrangement (10 segments) are depicted, although alternate numbers and shapes could be used. Outlet end support lattices, used with z-filter media, are described in U.S. Pat. No. 6,350,201, incorporated herein by reference.

Referring to FIG. 4, sealing of the filter cartridge 30 against the housing 10 occurs by driving the cartridge 30, in the direction of arrow 61, into sealing engagement with the housing 10, at outlet end 26. As can be understood from the figures and descriptions herein, this driving or biasing is preferably conducted without rotation of the filter cartridge around a central longitudinal axis projecting therethrough. A preferred biasing and lock mechanism 65, discussed below, is provided to effect this motion, although alternatives are possible.

Referring to FIGS. 6 and 7, attention is now directed to projection arrangement 67 positioned near, but spaced from, air exit end 33 and seal member 46. The projection arrangement 67 generally comprises first and second projections 68 (FIG. 6) and 69 (FIG. 7) respectively positioned on opposite sides, 70 and 71 respectively, of sheath construction 40, preferably as mirror images of one another. The projections 68, 69 generally project in directions opposite from one other. These projections 68, 69 are positioned to be engaged by a portion of the biasing and lock mechanism 65 as described below.

It is noted that the projections 68 and 69 can be provided and secured in a variety of matters, including by adhesive attachment, welding or by mechanical connection or other means as appropriate for the particular materials selected. Also, they can be molded or cast integrally with, and as a portion of, the sheath 40. When separately made, the projections 68, 69 can be constructed from a moldable material such as a hard plastic, or they can be manufactured from metal.

The particular configurations of the projections 68, 69 shown in FIGS. 6 and 7 are examples and are not required. The particular shape shown, each having an L-shaped cross-section, is convenient for manufacture by bending metal or extruding plastic. The shape is convenient for attaching to the particular shape of surface shown for the impermeable sheath construction 40. However a variety of alternate shapes are usable, for example with alternately shaped elements.

Referring to FIG. 7, cartridge 30 includes, adjacent inlet end 32, gasket member 80. Gasket member 80 is typically positioned immediately at end 32, or within 4 cm thereof, in typical preferred arrangements. The gasket member 80 will ensure that undesirable levels of dust do not reach region 81, FIGS. 5 and 7. Typically the gasket member 80 is simply sized and configured to fill a space between the cartridge 30 and the housing 10, at end 32. In the instance shown, since the housing interior 27 is rectangular, and outer periphery of the gasket 80 is rectangular.

In a typical arrangement, the housing could include a central support, not shown, along an inside surface 23*a* of bottom 23, FIG. 7 to help support the cartridge 30 in a proper orientation, during installation. As an alternative, the cartridge 30 can be supported in slides 94, 95 as shown or described below in connection with FIGS. 24 and 25.

In FIG. 4, underneath top 22 or access panel 11 (FIG. 2), the housing 10 includes a seal groove 82 therein, to provide for sealing, with an o-ring, between the top 22 and a remainder of the housing 10. Typically, the top 22 or access panel 11 will be mounted by bolts or similar constructions, and receivers for those bolts are shown at 84.

In a typical arrangement, the access panel 11 could include projections or other structures thereon for example as shown at 85, FIG. 6, positioned to engage in the cartridge 30, to help secure it in position.

In FIG. 4, housing outlet end 26, is shown with groove 86 therein for receiving a seal member, such as an o-ring seal, to seal with other constructions or duct work in the system. In FIG. 5, the housing end 25 is shown with groove 87 therein for receiving a seal member, such as an o-ring seal, for sealing with upstream constructions or duct work.

In FIG. 3, the housing 10 is depicted with the serviceable filter cartridge 30 in place, and with service cover 11, in place. In FIG. 3, the air cleaner 5 is viewed toward inlet end 25. FIG. 5 is generally analogous to FIG. 3, but with the top removed. The cartridge 30 can be viewed in place. A particular cartridge 30 depicted in FIGS. 2-9, includes a handle construction 88 thereon, FIG. 5. The handle construction 88 shown comprises a pair of cables or wires 89, positioned in a cross or x pattern secured by brackets 89a. Alternative handles are possible.

In FIG. 10, a schematic side view of side 20 is depicted. In FIG. 11, a fragmentary cross-section taken along line 11-11 FIG. 10 is shown. In FIG. 11, cartridge 30 is shown positioned in interior 27, with seal member 46 engaging region 47 of outlet end 26. The particular seal engagement shown, is an outside radial seal. That is, the seal surface of the seal member 46, is the surface directed radially outwardly. Sealing is a result of a seal material at this surface, engaging a radially inwardly directed surface, of the housing 10. Various alternate approaches, described for other figures below, are possible.

Upon review of FIGS. 2-9, the biasing and lock mechanism 65 depicted will be generally understood. In general, the biasing and lock mechanism 65 comprises a slider construction 90, FIGS. 6 and 7, and an actuator construction 91. For the particular embodiment shown, the slider construction 90 comprises first and second slides 94 and 95, (FIGS. 6 and 7). The slides 94 and 95 are preferably identical, but mounted as mirror images of one another, on inside surfaces of opposite sides 20, 19 respectively of housing 10. Each slide 94, 95 is mounted to be slideable toward and away from air flow outlet opening 16, in the general directions of double headed arrows 96, FIGS. 6 and 7.

The slider construction 90 generally includes a filter cartridge engagement portion. The filter cartridge engagement portion is oriented to engage the projection arrangement 67, so as to bias the filter cartridge 30 toward end 26 of housing 10, selectively.

As indicated above, the slides 94, 95 are generally identical, but mounted on opposite walls 20, 19 as mirror images of one another. For simplicity, only one of the slides 94, mounted on wall 20, FIGS. 8 and 9 will be described in detail. It will be understood that the other slide, 95 on wall 19, would operate analogously.

In FIG. 8, the slide 94 is shown positioned to bias the cartridge 30, FIG. 4, into a locked and sealed position. In FIG. 9 the slide 94 is shown in a position that will release the cartridge 30, FIG. 6, from a locked and sealed position, allowing the filter cartridge 30 to be removed from the housing 10 and to be replaced.

Referring to FIG. 8, an engagement portion of slide 94, for the cartridge 30, comprises end 100. End 100 has an elongate edge 103 which could be orientated to engage projection 69, FIG. 7 of cartridge 30. In such embodiments, edge 103 could be lined with a rubber or elastomer material, to provide for some spring effect at the engagement between edge 103 and projection 69. A variety of materials can be utilized for the lining at edge 103, for example a low durameter (12-25 Shore A) or medium durameter (25-50 Shore A) polymeric material.

Instead of edge 103 engaging projection 69, for the preferred embodiment shown, a mechanical interlock between the projection 68, 69 and the slides 95, 94 is provided. In particular, an interlock arrangement in which the projections 68, 69 slide into receiving grooves in end 100 is used. Such an arrangement is described in detail, below, in connection with a description of FIGS. 24 and 25.

In general, the actuator construction 91 shown, FIG. 8, includes operator handle 107, opposite control arms 108, 109, (one of which is shown in FIG. 8) and a biasing arrangement 110 (FIG. 8) including a pair of biasing members, one of which is shown in FIG. 8 at 111. The operator handle 107 and biasing arrangement 110 are constructed and arranged such that when the operator handle 97 is in a lowered position as shown in FIGS. 8 and 4, the slider construction 90 is biased by the biasing arrangement 110 in the direction of arrow 112, FIG. 8, to drive an engaged filter cartridge 30, FIG. 4 towards end 26 and into a sealed orientation, preferably as shown without any rotation of the filter cartridge 30. On the other hand, the biasing arrangement 110 is also constructed such that when the operator handle 107 is lifted to the upper or raised position or orientation shown in FIGS. 9, 6 and 7, the biasing arrangement 110 moves the filter cartridge 30 in the direction of arrow 113, FIG. 9, out of sealing engagement with end 26 of housing 10, FIGS. 6 and 7.

Figure 24:
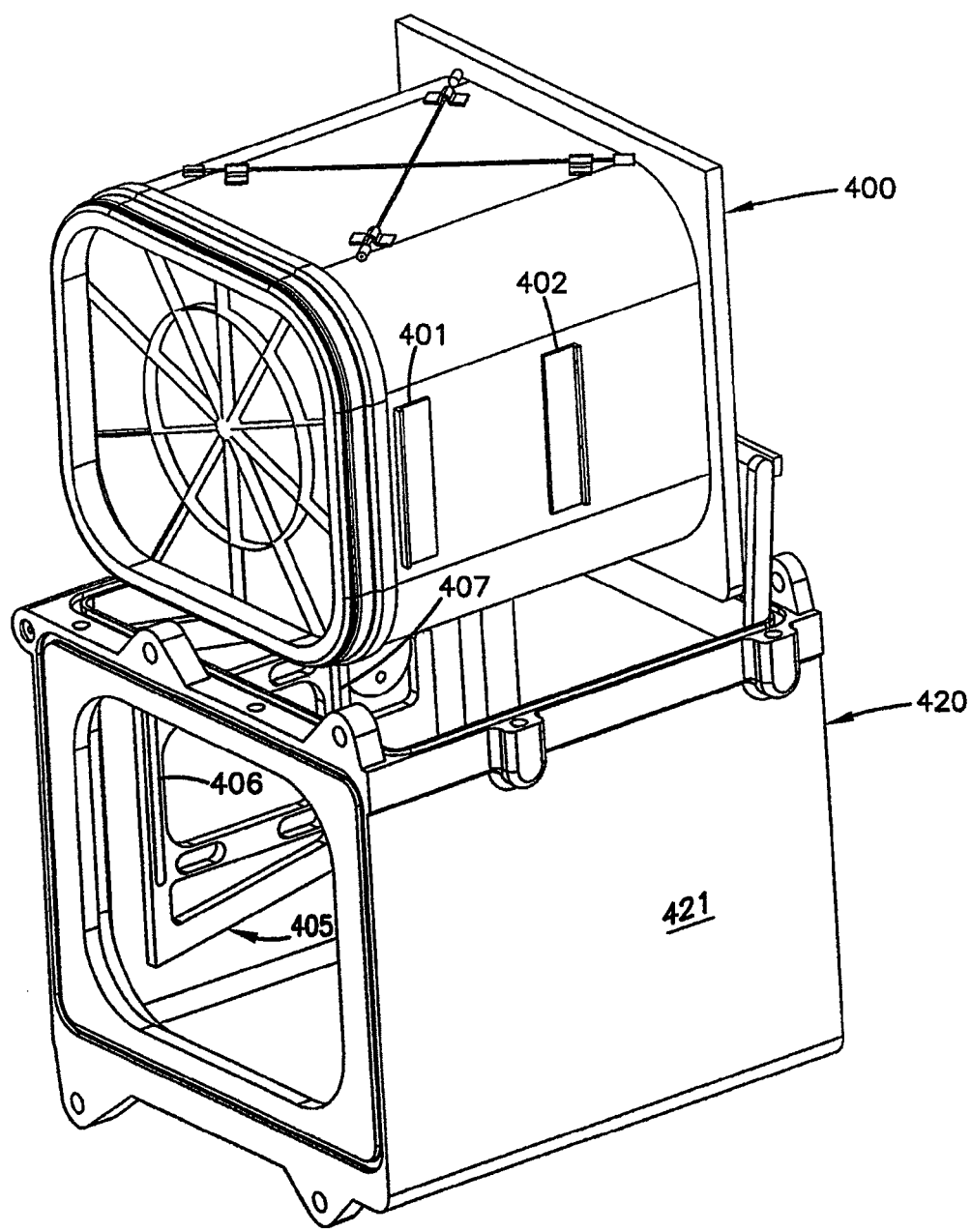
FIG. 24 is an exploded, perspective view of mechanical interlock features between a housing and filter cartridge, useable in any of the embodiments of FIGS. 2-19.
Figure 25:
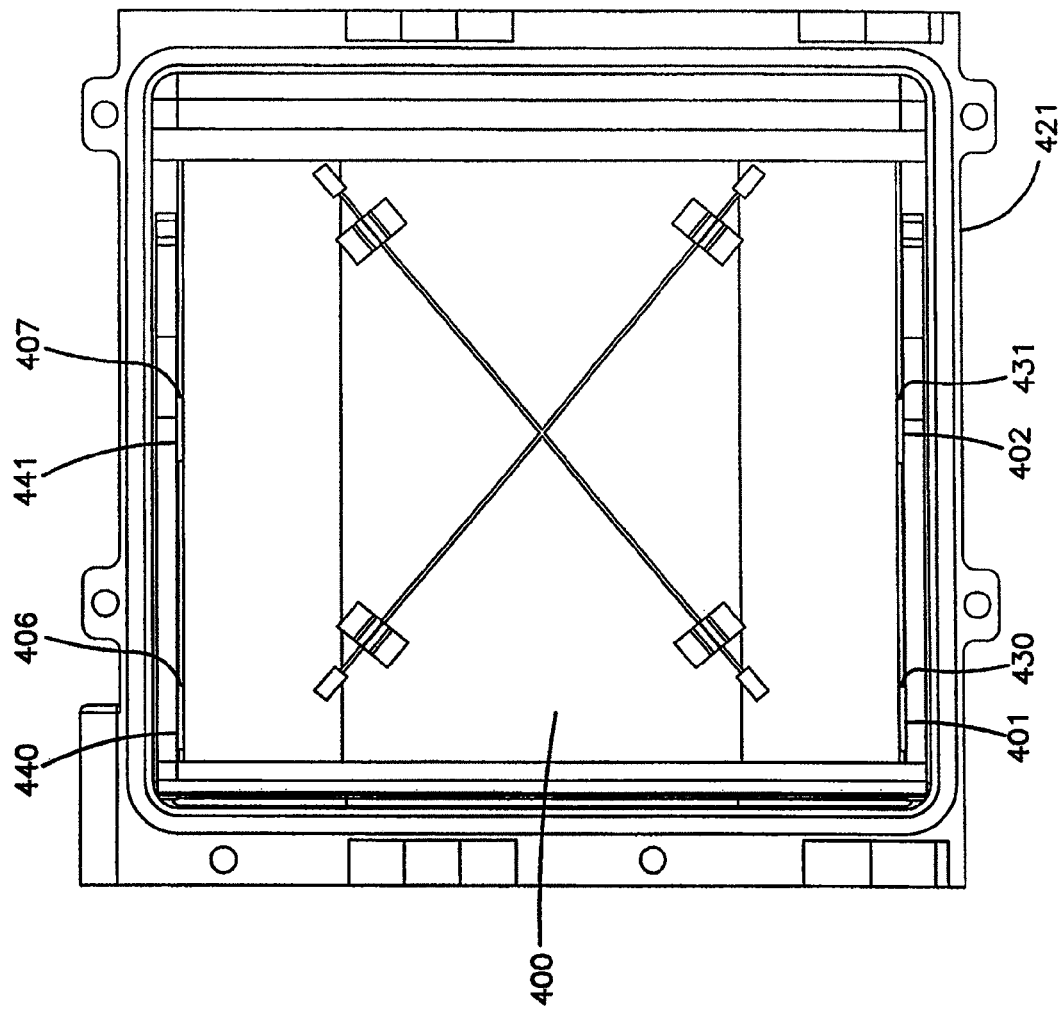
FIG. 25 is a fragmentary, top plan view of the arrangement shown in FIG. 24.

For the particular arrangement shown, the biasing arrangement 110 is configured to positively bias the serviceable filter cartridge 30 away from end 26 of housing 10 in the direction of arrow 113, FIG. 9, as shown without rotation as opposed to merely releasing the filter cartridge 30 from sealing engagement with end 26, due to the mechanical interlock described with respect to FIGS. 24 and 25. Also, this operation of the biasing arrangement is in part provided by end 115 on slide 94 (and an analogous end on slide 95). End 115 can be made to include an edge 116 which can be orientated to engage a projection similar to projection 120, FIG. 7, on the filter cartridge 30 to drive the cartridge 30 in the direction of arrow 113, FIG. 9. The projection 120 is one of a pair, including projection 121, FIG. 6, which can be configured to be similarly engageable by slide 95. The projections 120, 121 can be generally analogous to projections 68, 69 but oppositely positioned and orientated adjacent air inlet end 32 of cartridge 30.

Instead of using edge 116 to engage the projection 120, the preferred arrangement of FIG. 7 utilizes a mechanical interlock arrangement, as discussed below in connection with FIGS. 24 and 25, in which the projection 120 engages a groove on the associated slide.

From a review of FIG. 9, it should be apparent that when the slide 94 is driven in the direction of arrow 113, projection 120 (FIG. 7) will be pushed in order to drive the cartridge 30 in the direction of arrow 113 and out of sealing engagement with end 26 housing 10.

Referring again to the actuator construction 91, FIGS. 8 and 9, in general the biasing arrangement 110 comprises rotatably mounted cams, one of which is shown at 123. The cams would be positioned as mirror images of one another, on walls 20 and 19 respectively.

Referring to FIG. 8, for the preferred arrangement shown, each cam 123 has a general "b" shape (or "d" shape if viewed from the opposite direction or side). Thus, each cam 123 has a circular portion 123a and a tangential leg portion 123b. The cams 123 are positioned such that the tangential legs 123b, extend generally vertically, when the cams 123 are rotated into a lock position, FIG. 8, to cause sealing between the filter cartridge 30 and end wall 26, FIG. 4. The cams 123, are mounted to eccentrically pivot, shown at pivot point 126, FIGS. 8 and 9. Thus, when rotated by lowering handle 107, FIG. 8, the cams 123, will generally bias the slides 94, 95 in the direction of arrow 112, FIG. 8.

The orientation shown in FIGS. 8 and 4, is a locked and sealed orientation. It results from the operator handle 107, FIGS. 8 and 4, being in a lowered position. When the operator handle 107 is lifted into the orientation of FIG. 9, rotational moment is transferred to the cam 123 by arm 108 (and for the opposite cam arm 109).

From a comparison of FIGS. 8 and 9, it will be apparent when the operator handle is lowered, FIG. 8, the cams 123, as a result of their eccentric mounting, rotate to drive tangential legs 123b, into portion 130 of the slide 94, in the direction of sealing, i.e., in the direction of arrow 112. On the other hand, when operator handle 107 is lifted, FIG. 9, the cams 123, rotate such as to bias of the slides 94, 95, away from end 26 of housing 10, and thus to drive filter cartridge 10 out of sealing engagement, in the direction of arrow 113.

The particular slides 94, 95 depicted, have a generally Y-shape laid on its side and having a tail. The cams 123 are sized to fit between the lateral extension 115 at the tail 131 of the Y and a base portion 132 of the Y.

Referring to FIGS. 8 and 9, in general the slides 94, 95 include in addition to front end 100, top and bottom diagonal edges 140, 141, cross pieces 142, base 132, tail extension 131, and tail 115. The cross pieces 142, include slots 145 therein, for slideable mounting upon bolts, pins or other constructions in the side walls 20, 19, not shown. The slides 94, 95 can be molded, cast or constructed from various materials such as plastic or metal.

The biasing mechanism also operates as a lock mechanism, so that when the operator handle 107 is in the lowered position, FIGS. 2 and 3, and the access panel 11 is in place, the operator handle cannot be lifted. This means that the filter cartridge 30 cannot back out of sealing engagement with the housing 10.

In a typical application, projections 68, 69 will be located spaced from but adjacent to outlet end 33 of the filter cartridge 30 and seal member 46. Generally spacing from the end 33 and seal member 46 on the order at least 0.5 cm, typically about 1 to 10 cm, will be used.

Similarly, projections 120, 121 will generally be located adjacent to be spaced from inlet end 32 and gasket 80 of the filter cartridge 30. Typically spacing from the end 32 and gasket 80 of at least 0.5 cm, usually within the range of 2 to 20 cm, will be used.

Typically and preferably projections 68, 69 are spaced a different distance from end 33, than are projections 120, 121 spaced from end 32. This will help provide that the cartridge 30 can only be inserted into the housing 10 in a proper orientation, i.e., with outlet end 33 directed toward end 26 of housing 10, and not improperly rotated 180° around a vertical axis. Other or additional interference or lock and key arrangements can be used, to avoid or prohibit inappropriate orientation of the cartridge 30 relative to the housing 10, in use.

Also, flanges 120, 121, need to be positioned and sized so as to clear the arms 108, 109, FIG. 7, when the cartridge is removed from, or installed in, the housing 10.

A variety of different seal types can be utilized for the engagement between the seal member 46 on a cartridge 30, and the seal surface at end 26 of the housing 10. The particular arrangement shown for FIGS. 2-11, is an outside radial seal as described above. Such an outside seal arrangement is described, for example, in U.S. Pat. No. 6,350,291, the complete disclosure of which is incorporated herein by reference. A particular seal member of this type is described at FIG. 23 below.

Figure 23:
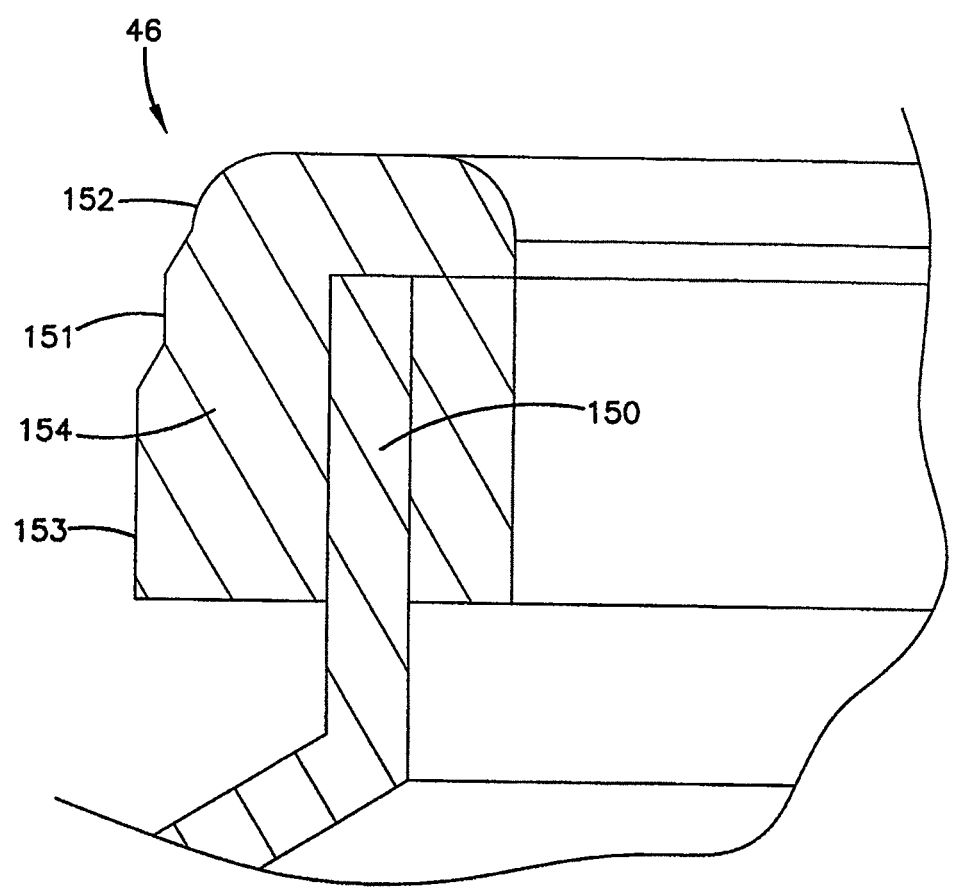
FIG. 23 is an enlarged, fragmentary, cross-sectional view of a seal member of the arrangement of FIGS. 2-7.

Referring to FIG. 23, the particular arrangement disclosed, uses a back up support 150 for the seal 46. Seal surface 151 has a stepped configuration, with increasing size between end 152 and region 153. The seal material in region 154 will compress, and reduce in thickness, against support 150 and a radial sealing surface of the housing, in use, to provide a positive air seal. Alternate arrangements can be used.

A further understanding of the seal will be provided by review of FIGS. 10 and 11. In particular, FIG. 11 is a fragmentary, cross-sectional view taken along line 11-11, FIG. 10. The side radial seal is generally located at 46, against portion 47 of the housing 10.

Figure 12:
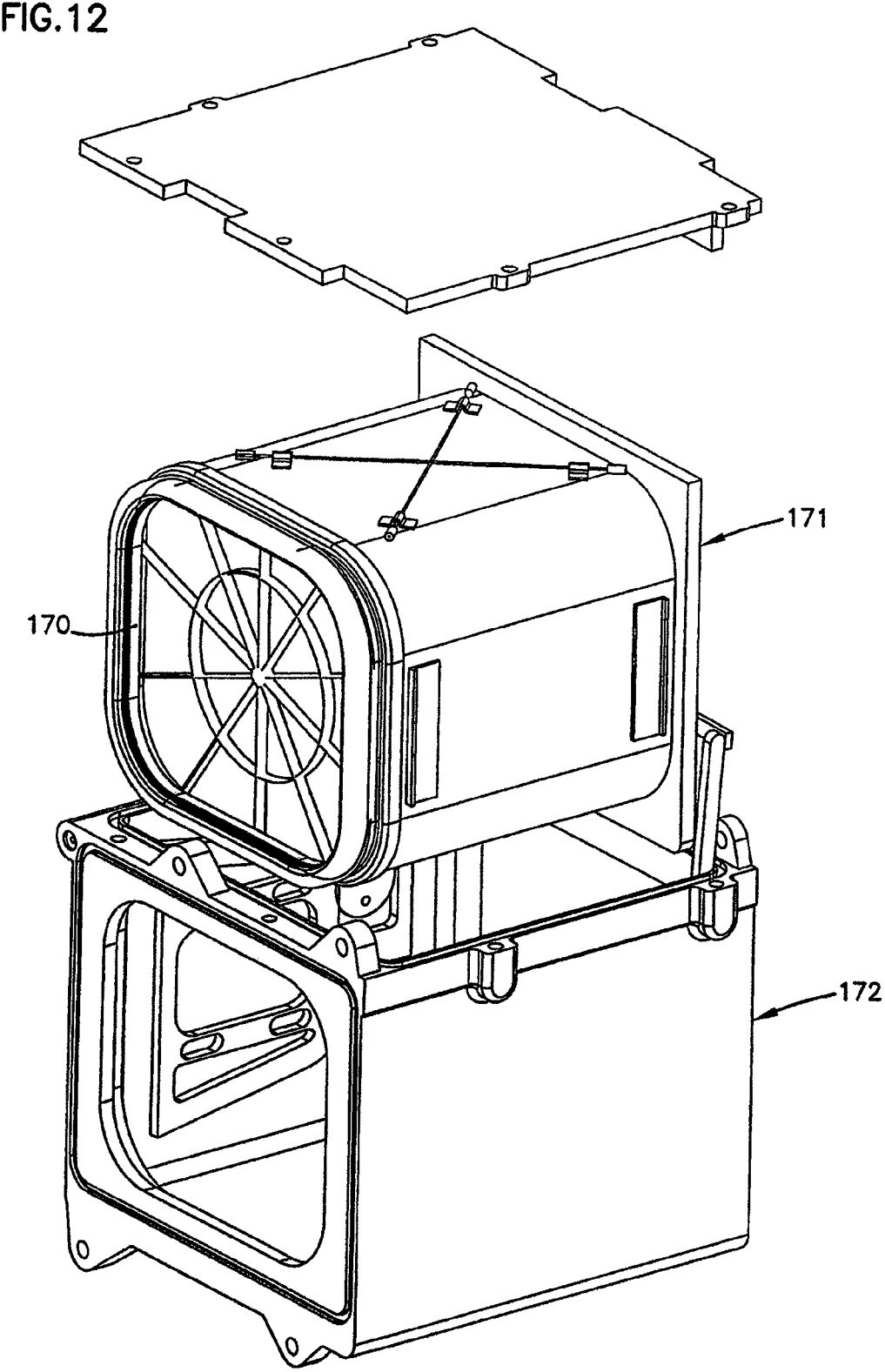
FIG. 12 is an outlet end, exploded, perspective view analogous to FIG. 6 but taken of a first alternate embodiment.
Figure 14:
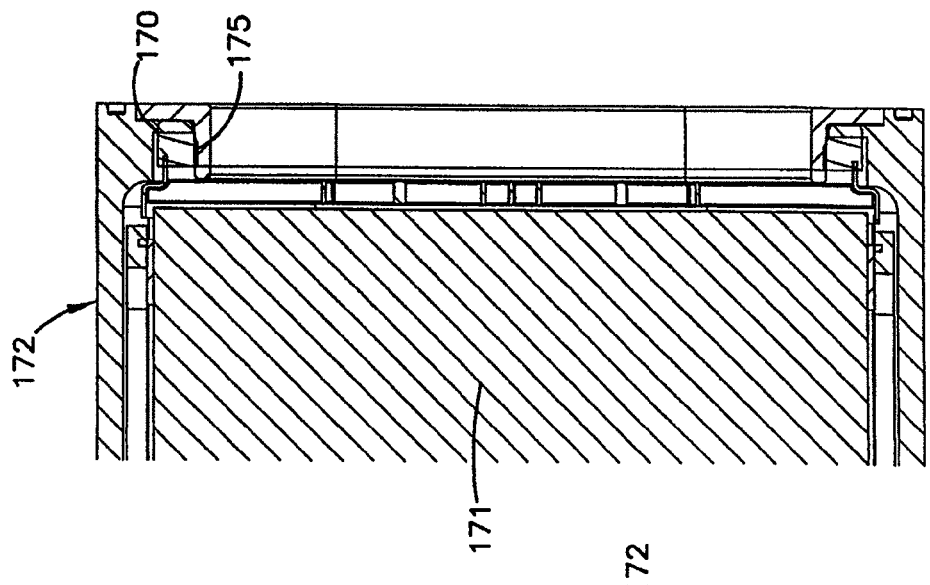
FIG. 14 is a schematic, fragmentary, cross-sectional view taken generally along line 14-14, FIG. 13.
Figure 13:
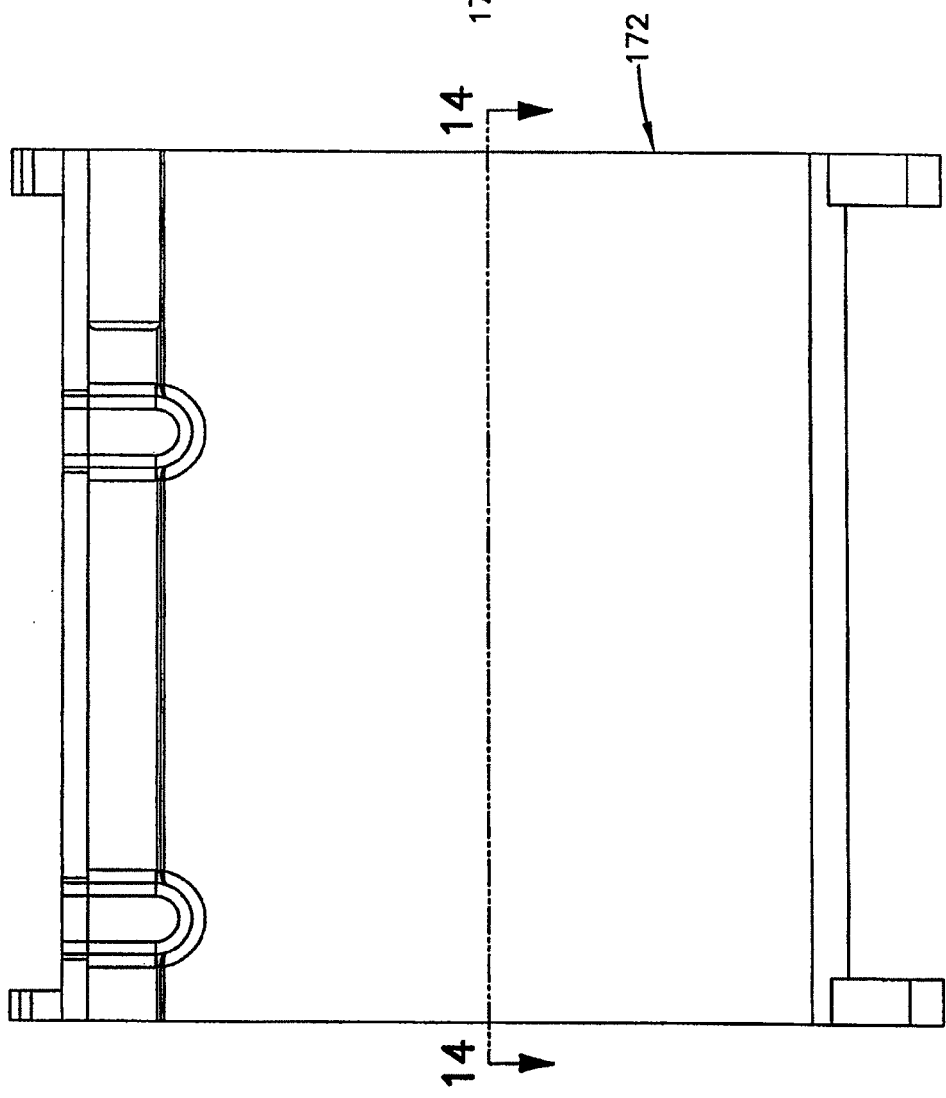
FIG. 13 is a side elevational view of the arrangement shown in FIG. 12.

It is noted that radial seal having an inwardly directed configuration can also be used. Referring to FIG. 12, an example of such an arrangement, the seal would be located in region 170 of cartridge 171. Engagement with the housing 172 is shown in FIG. 14, and occurs by positioning the seal region 170 of the cartridge 171 around an outside of a sealing rim 175 of the housing 172. FIG. 14 is a schematic, fragmentary cross-sectional view taken along line 14-14, FIG. 13.

Figure 15:
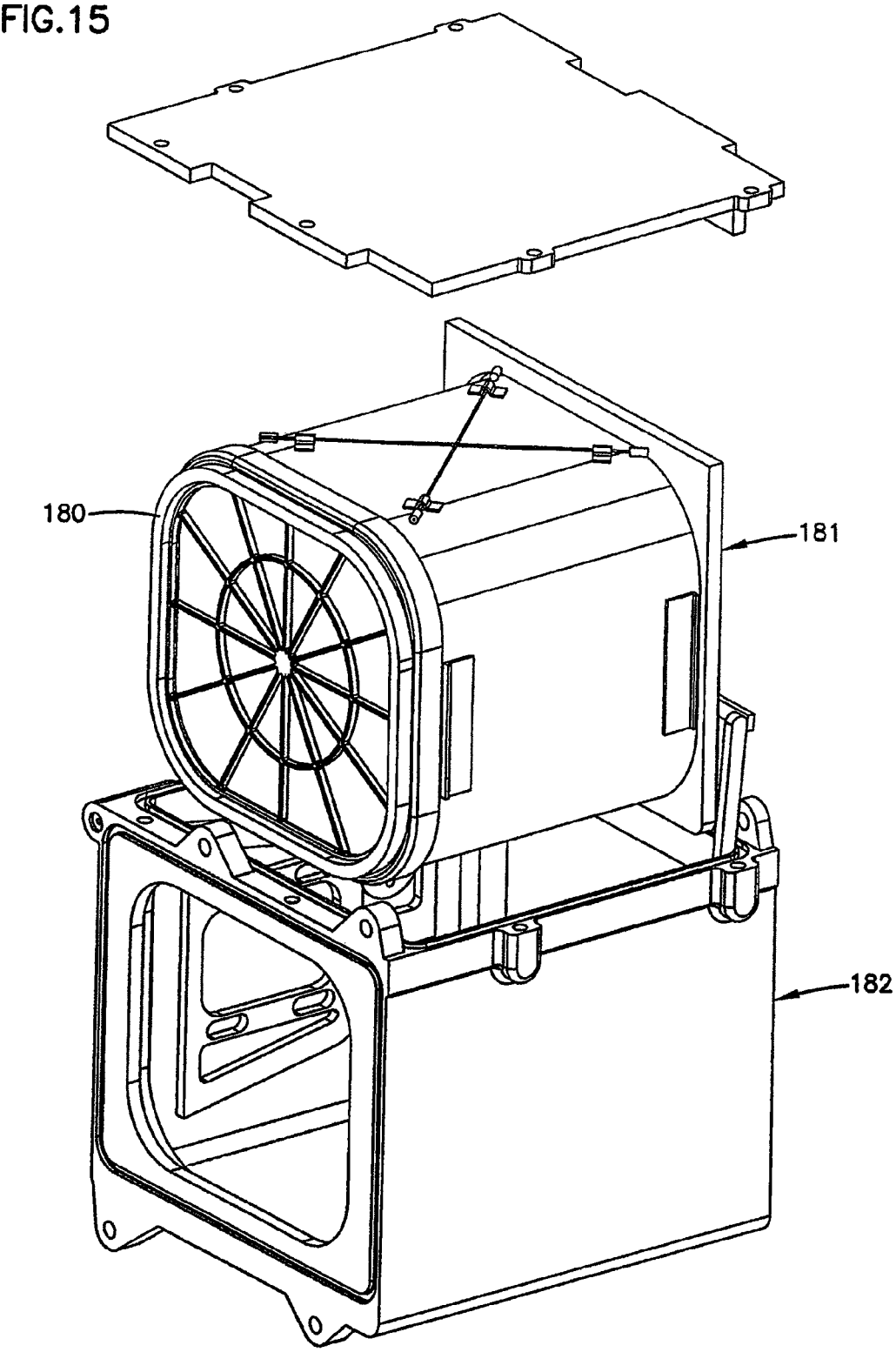
FIG. 15 is an exploded, perspective view analogous to FIG. 6, of a second alternate embodiment of the present disclosure.
Figure 17:
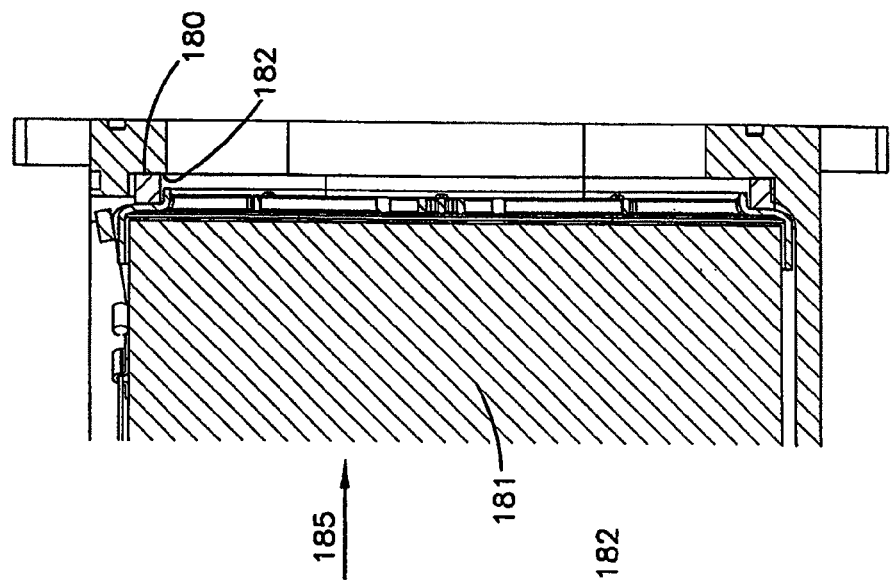
FIG. 17 is a schematic, fragmentary, cross-sectional view taken generally along line 17-17, FIG. 16.
Figure 16:
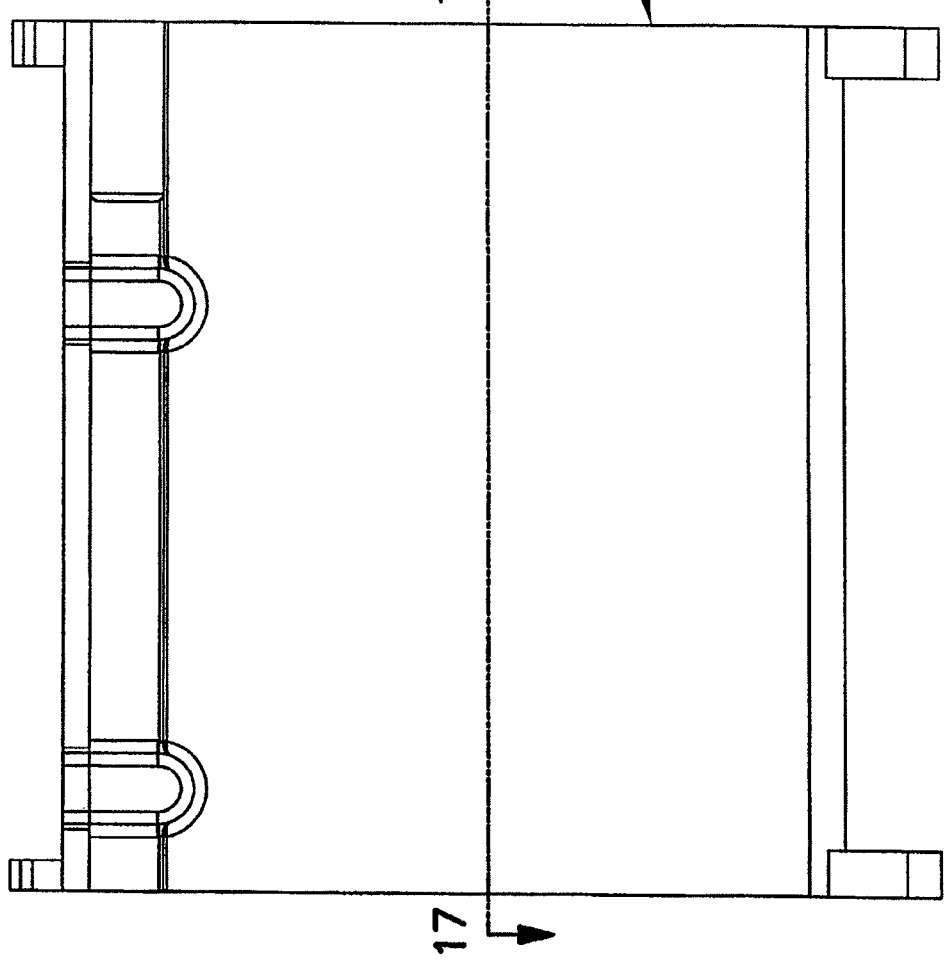
FIG. 16 is a side elevational view of the embodiment of FIG. 15.

It is also noted that in some embodiments, an axial seal can be used. Such an arrangement is shown in FIGS. 15-17. Here, the sealing surface is at 180, for sealing between the cartridge 181 and the housing 182. The arrangement is termed axial, since the seal force is directed axially, i.e., parallel to line 185, FIG. 17, and not radially; i.e., orthogonally away from, or toward, line 185. FIG. 17 is a schematic, fragmentary cross-sectional view taken along line 17-17, FIG. 16.

Any of these types of seal arrangements, and variations of them, can be utilized with assemblies according to the present disclosure.

Referring to FIGS. 2-7, the particular filter cartridge 30 has a generally rectangular cross-section, with curved edges or corners, although alternates can be used. The opposite sides with flanges 68, 69 mounted thereon are about 9 to 10 inches tall, the opposite top and bottom surfaces are about 10-11 inches wide, and the cartridge 30 is about 9-11 inches long. It is noted that the corners are generally curved, to accommodate the sealing around a coiled media construction. Of course projections such as projections 68, 69 can be put on a cartridge of a variety of alternate shapes.

Figure 18:
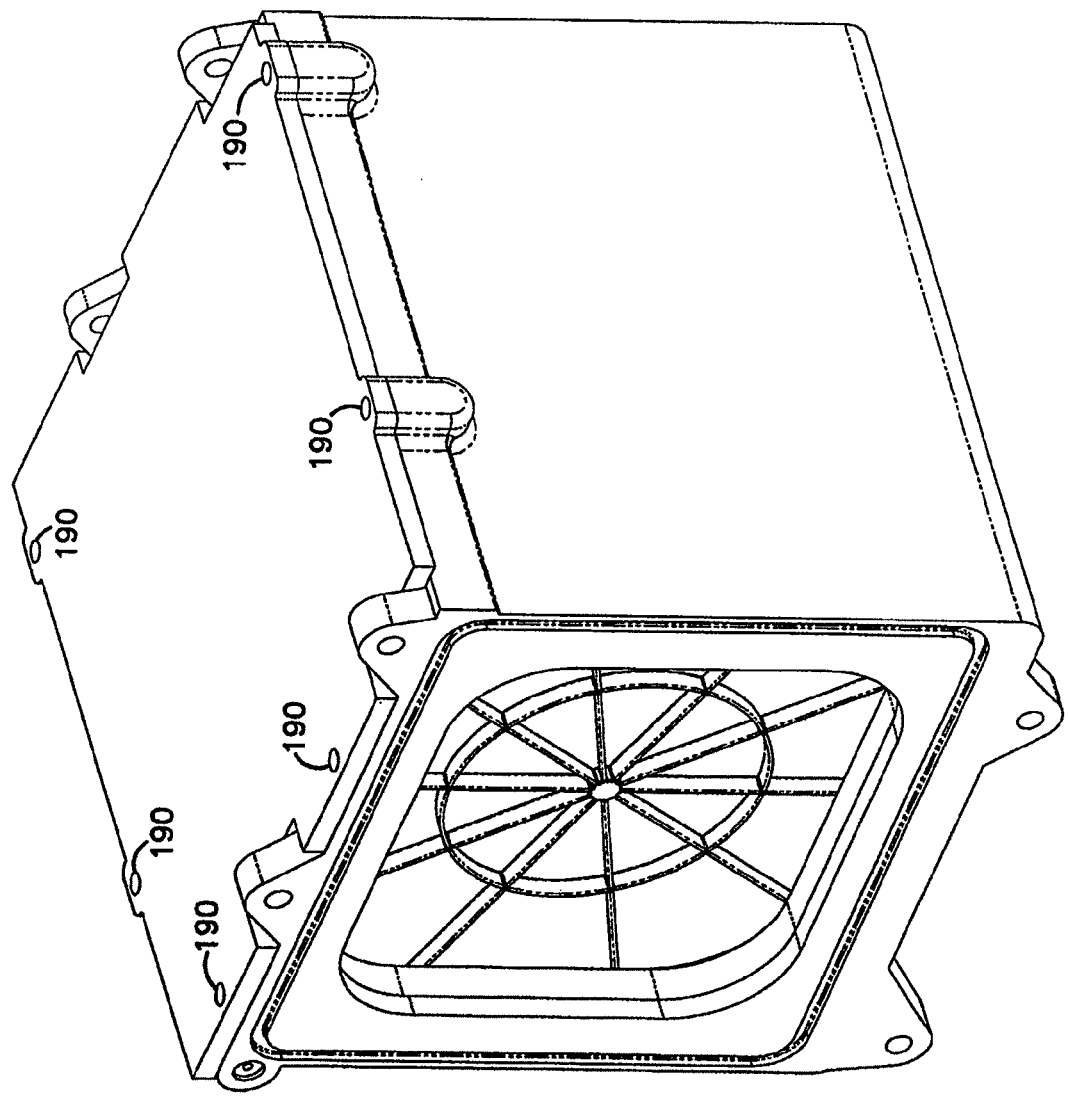
FIG. 18 is an outlet end, perspective view analogous to FIG. 2, of a third alternate embodiment of the present disclosure.

Attention is now directed to the embodiment of FIG. 18. The embodiment of FIG. 18 is generally analogous to the embodiments of FIGS. 2-17, except the housing is depicted without outwardly projecting receivers, for bolts for attachment of the cover. This is simply to indicate that alternate mechanisms could be used, if a flat profile of the outer surface of the housing is needed. Recessed bolts at 190 could be used for this purpose.

Figure 19:
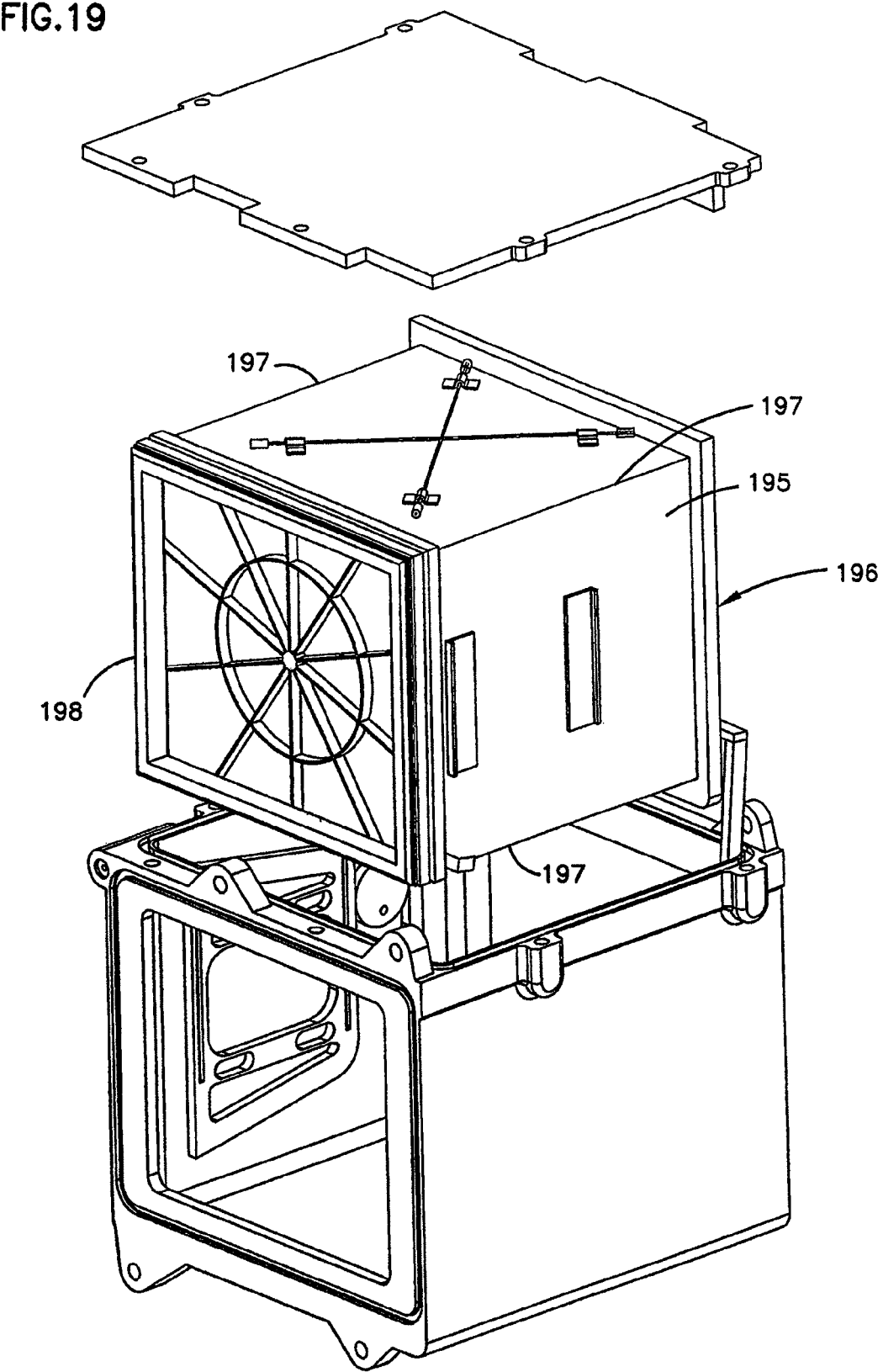
FIG. 19 is an exploded, perspective view analogous to FIG. 6, of a fourth alternate embodiment of the present disclosure.

Attention is now directed to the embodiment of FIG. 19. In this embodiment, the sheath 195 of the cartridge 196 is shown with square edges or corners 197. Such a housing shape could be used to contain stacked media, FIG. 21 for example. The particular arrangement of FIG. 19 shows a cartridge 196 which has the seal material 198 mounted upon a square cornered frame. However, rounded corners for the seal could be used, especially for a radial seal.

Attention is now directed to FIG. 20. In FIG. 20 a fragmentary, schematic view of z-filter media is shown. The media 200 includes a corrugated sheet 201 secured to a non-corrugated (i.e. non-fluted) sheet 202. The upstream end or edge is indicated at 203, the downstream end or edge at 204. Flutes 205, above the corrugated sheet 201, are open at the upstream end 203, for passage of air to be filtered therein. These flutes are closed at the downstream end 204, by sealant 210. Outlet flutes are indicated underneath the corrugated sheet 201 at 211, closed at the upstream end by sealant 215.

Figure 21:
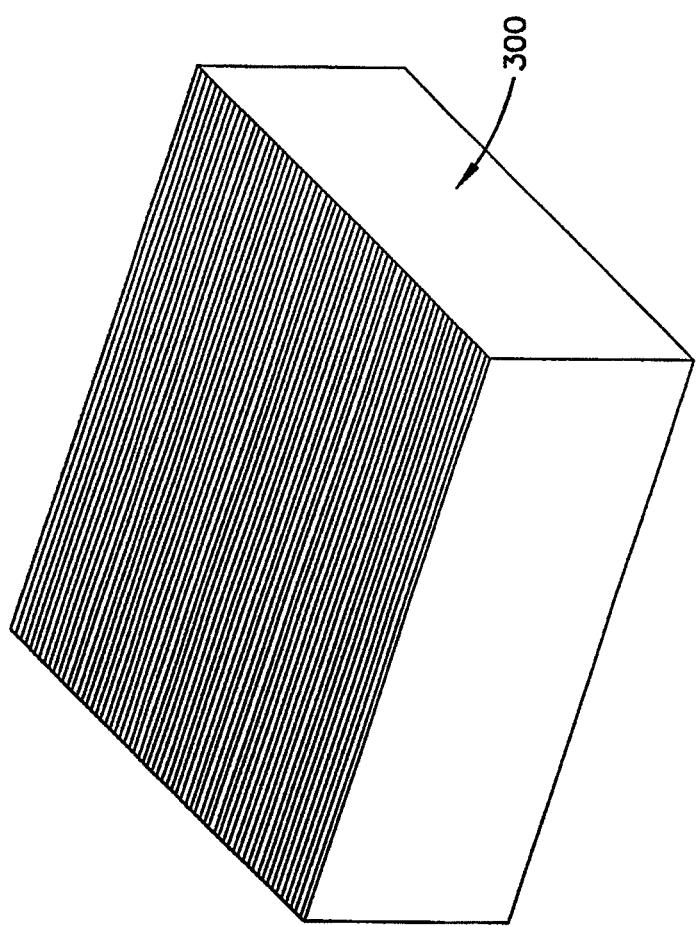
FIG. 21 is a stacked z-filter media arrangement utilizing the media FIG. 20.
Figure 22:
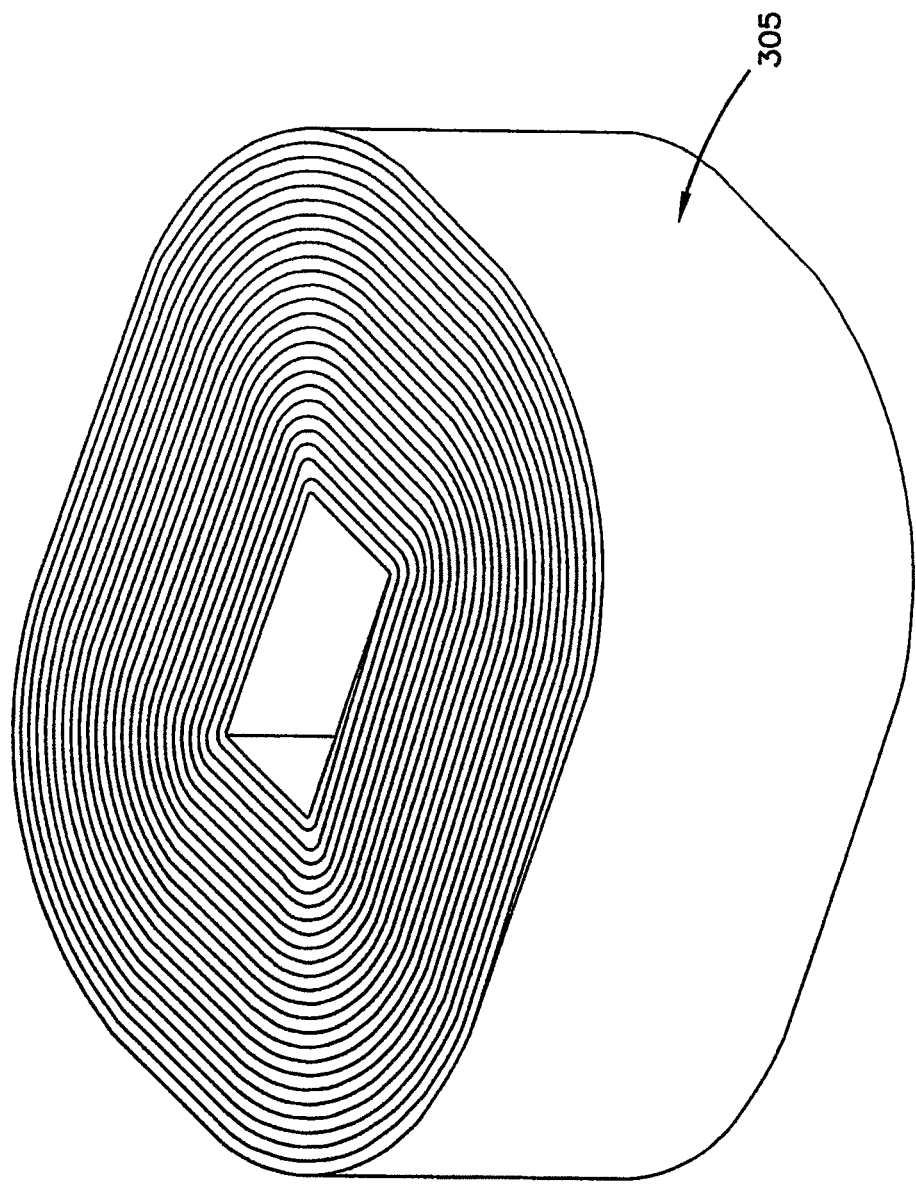
FIG. 22 is a schematic representation of a coiled z-filter media arrangement utilizing the media of FIG. 20.

Media shown in FIG. 20, can be cut in strips and stacked, to create a stacked arrangement 300 such as shown in FIG. 21. Alternatively, the media can be coiled into a coiled shape 305 as shown in FIG. 22, can be used in an arrangement according to the present disclosure.

A variety of alternate z-filter media configurations to that shown in FIG. 20 can be used. For example tapered flutes in accord with the disclosure of PCT Publication WO 97/40918, can be utilized. Alternatively, flutes which are folded closed at one or more ends in accord with the disclosures of U.S. Provisional 60/395,009 and the PCT Application filed Jan. 31, 2003 and incorporated herein, above, by reference, can be used.

The media may comprise a variety of materials. The particular media choice would depend upon the particular application of use involved. Typically non-woven fibrous constructions, comprising cellulose fibers, synthetic fibers or mixtures of the two, would be used. In some instances a surface application, such as a fine fiber application, can be used for preferred efficiency.

Attention is now directed to FIGS. 24 and 25. FIGS. 24 and 25 are schematic and fragmentary. They are intended to show a positive engagement arrangement provided between the projections on the elements and the sliders on the housing.

Referring to FIG. 4, the cartridge is indicated at 400. It includes projections 401 and 402, with a pair of analogous projections mounted as mirror images on an opposite side.

In FIG. 24, one of the sliders 405 is depicted. The slider includes a front groove 406 and a rear groove 407. It will be understood that when cartridge 400 is installed in a remainder of the housing 420, the mirror image projections to projections 401 and 402, at an opposite side of cartridge 400, can be slid into grooves 406 and 407 respectively. Similarly projections 401 and 402 can be slid into grooves on a mirror image slider to slider 405, mounted on inside of wall 421. This would provide for positive mechanical engagement between the cartridge 30 and a remainder of the housing, and will facilitate mounting and dismounting of the cartridge 30 in place. Also, the bottoms of the grooves can be used to support the filter cartridge above a bottom of the housing.

In FIG. 25, a top plan view is shown with projections 401 and 402 engaging slots 430 and 431 and with opposite projections 440 and 441 engaging slot 406 and 407.

It will be understood that in FIGS. 24 and 25 only features necessary to show the general orientation of the parts, and the operation of the mechanical inner lock were shown. Other detail, such as the control arm, etc., was not shown. The interlock arrangement of FIGS. 24 and 25 can be used with any of the embodiments described above.

Also, a reverse interlock involving ribs on the sliders and grooves on the cartridge could be used, as well as other variations.

II. FIGS. 26-29

Figure 26:
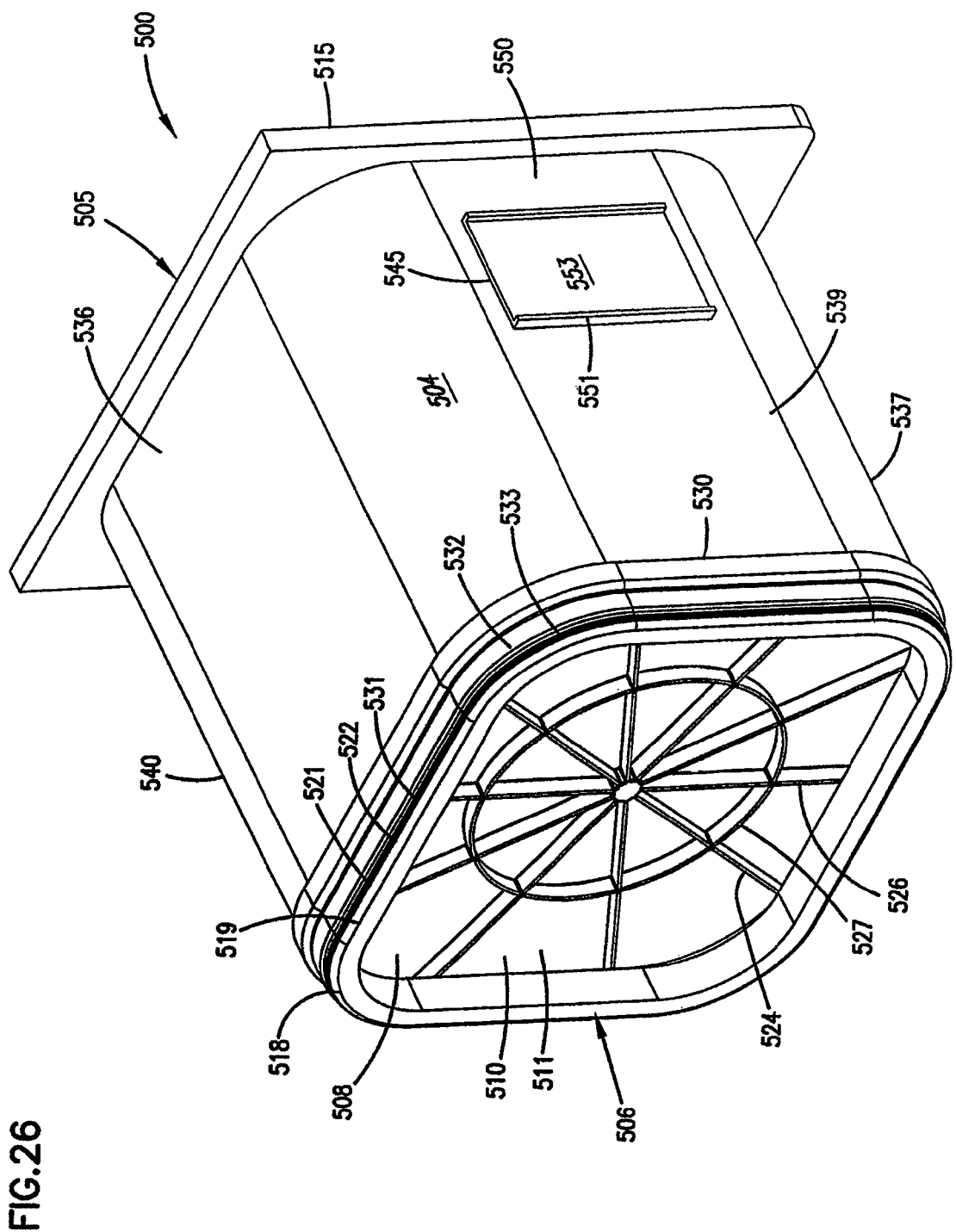
FIG. 26 is a perspective view directed toward the outlet end of a serviceable filter cartridge according to a fifth alternate embodiment of the present disclosure.
Figure 27:
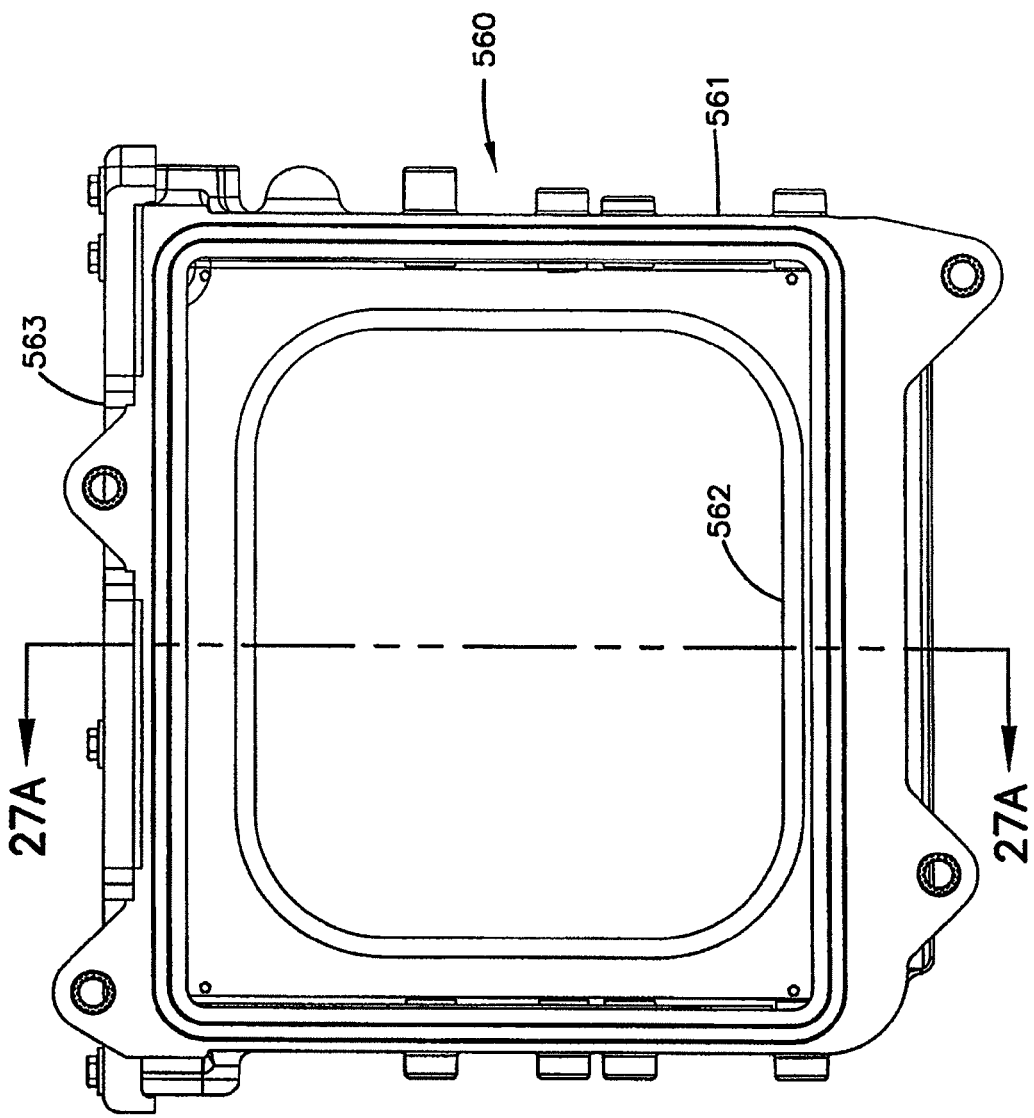
FIG. 27 is a schematic end view of a housing assembly usable with the serviceable filter cartridge of FIG. 25.
Figure 28:
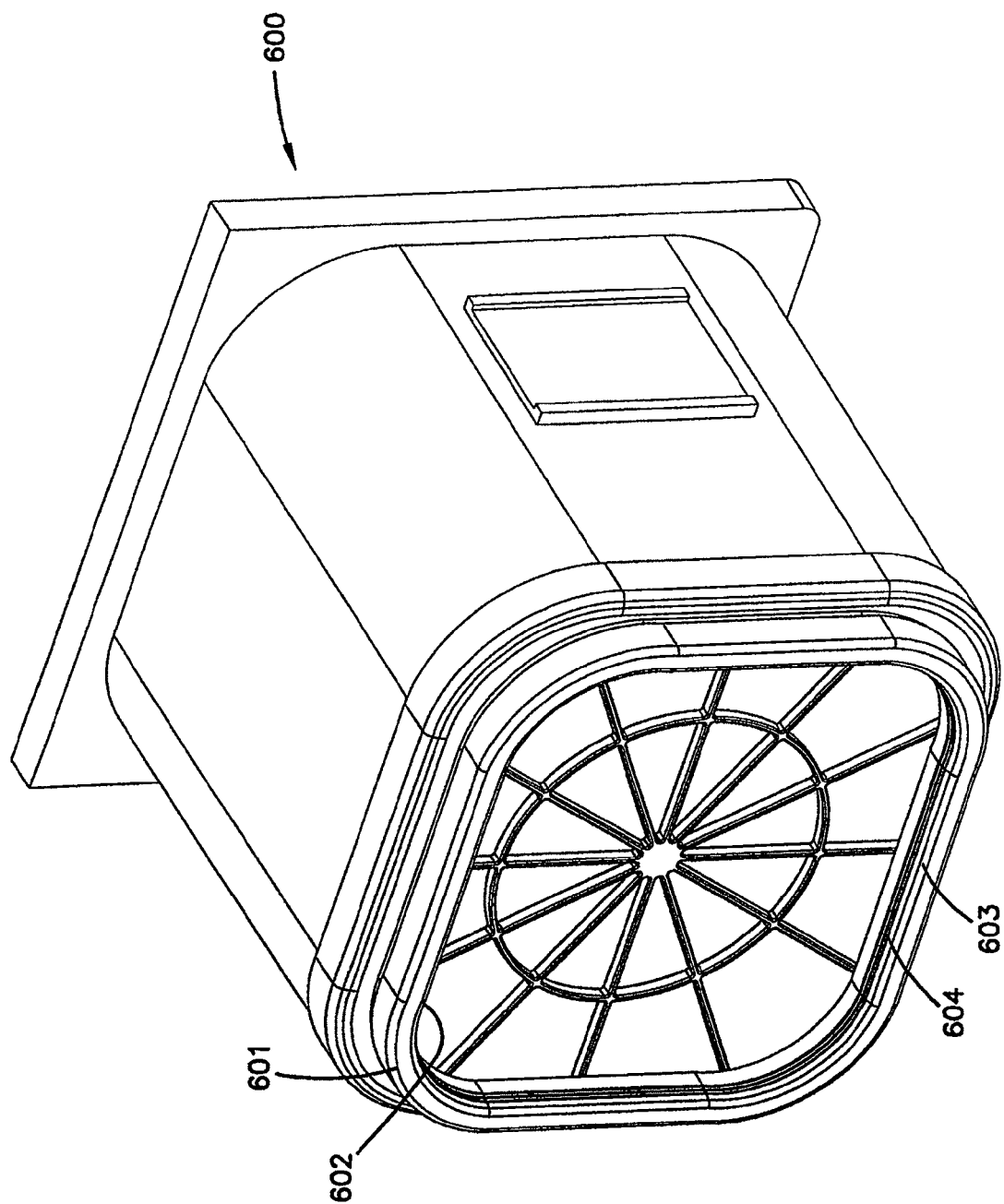
FIG. 28 is a perspective view directed toward an outlet end of a serviceable filter cartridge having an inside radial seal according to a sixth alternate embodiment of the present disclosure.

In FIGS. 26-29, the principles described above with respect to FIGS. 1-25 are depicted implemented in two alternative embodiments, one involving a serviceable filter cartridge having an outside radial seal (FIG. 26) and one involving a serviceable filter cartridge having an inside radial seal (FIG. 28).

Referring to FIG. 26, a preferred serviceable filter cartridge 500 is depicted. In accord with the serviceable filter cartridge 30, FIG. 6, cartridge 500 includes an outer, impermeable, sheath construction 504 defining an open air flow inlet end 505 and opposite open air flow outlet end 506, for a straight through flow definition. Sheath 504 defines an interior 508 in which z-filter media 510 is positioned. Preferably the z-filter media 510 comprises a coiled arrangement 511, although a stacked arrangement could be used. The coiled media arrangement 511 preferably comprises a corrugated (fluted) sheet secured to a non-fluted (preferably non-corrugated) facing sheet to form a composite; the composite being coiled as a continuous strip into a rectangular, coiled, arrangement having four planar sides and four rounded corners, somewhat analogous to the structure of FIG. 22.

As with previous embodiments, the outer impermeable sheath arrangement 504 may comprise, for example, a molded plastic construction or a metal construction. Further, it may comprise a single piece or a multi-piece construction. It is anticipated that typically it will be formed from two substantially identical shell halves which can engage one another to form a sheath 504 having a rounded corner, generally parallelogram (preferably rectangular) configuration, as shown.

Adjacent inlet end 505, the serviceable filter cartridge 500 includes secondary gasket member 515. The gasket member 515 is shaped, positioned and configured to engage a housing (see FIG. 27) adjacent the serviceable cartridge inlet end 505 to inhibit inlet dust from reaching regions around sheath 505 between gasket 515 and outlet end 506. The gasket member 515 may comprise a variety of materials, for example molded, foamed, polyurethane. For the particular embodiment shown, gasket 515 has a generally rectangular outer perimeter, with four straight segments.

Adjacent outlet end 506, serviceable filter cartridge 500 includes primary seal arrangement 518. The primary seal arrangement 518 comprises a seal member support framework 519. The seal member support framework 519 may be integral with other portions of sheath 504. However in this instance, the frame work 519 is a separate, preformed, framework attached to sheath 504.

The support framework 519 includes a seal support (not viewable) embedded within seal material 521. The seal material 521 is positioned with a seal surface 522 positioned to engage a housing seal surface, not shown in FIG. 26, during a sealing such that the seal material 521 is sealed against a surface in the housing, preferably by being compressed between an embedded seal support of the support framework 519 and the seal surface 522. Alternate seal configurations can be used. In the particular embodiment shown, the seal surface 522 is positioned as a radial seal, i.e., the seal forces or forces of sealing, will generally be toward or away from a central longitudinal axis extending between ends 505, 506 of sheath 504, and the seal forces are directed in the same direction as a central axis for sheath 504. Preferably the seal material 521 is a foamed polyurethane.

For the particular filter cartridge 500 depicted in FIG. 26, the seal surface 522 is directed as an outside radial seal, i.e., it is directed radially outwardly from an embedded seal support of the framework 519. Thus, the seal arrangement 518 may have a cross-section analogous to that indicated in FIG. 23. In use, it would be circumscribed by a seal surface or structure on a housing.

For the particular embodiment shown in FIG. 26, at outlet end 506 an outlet end support lattice 524 is provided. The particular lattice 524 depicted, comprises a plurality of spokes 526 interconnected by ribs 527. The spokes and ribs 526, 527 may be integral with one another, and integral with a remainder of framework that performs the support framework 519. The outlet end support lattice 524 generally provides for extensions across open end 506, downstream from media 510. The support lattice 524 may comprise, for example, a molded plastic construction or a metal construction.

For the particular arrangement shown, the support framework 519 includes an outer skirt 530 positioned for mounting to circumscribe sheath 504 adjacent end 506.

The particular, preferred, seal surface 522 depicted, has a stepped configuration 531 with a portion 532 having a larger outer perimeter size than an adjacent portion 533, to preferably provide at least two sealing steps. Additional sealing steps can be provided. In FIG. 23, three (3) steps are shown.

For example, typically and preferably the seal arrangement is configured, in cooperation with a housing configuration, such that at least a portion of the seal material 521 in the region of seal surface 522 will compress at least 0.5 mm, typically at least 0.75 mm and preferably at least 1 mm, or more, during sealing. Alternate seal types can be used.

Preferably, the perimeter shape of the seal surface 522 is a parallelogram having: (a) a first pair of opposite, straight, parallel sides; (b) a second pair of opposite, straight, parallel sides; and, (c) four rounded corners. A rectangular shape depicted is preferred.

Still referring to FIG. 26, serviceable filter cartridge 500 preferably has a perimeter shape having two pairs of parallel sides with rounded corners between them. Thus one pair is an opposite top 536 and bottom 537; and, the other pair is opposite sides 539, 540. The top 536 and bottom 537 generally have central planar areas that extend parallel to one another; and, sides 539 and 540 generally have central planar areas which extend parallel to one another, and preferably generally perpendicular to central planar areas of the top and bottom 536, 537.

The serviceable filter cartridge 500 includes, on sides 539, 540, a projection arrangement 545. Typically the projection arrangement 545 mounted on side 539 will be identical to the projection arrangement mounted on opposite side 540, except mounted as a mirror image. Thus, projection arrangement 545 will be discussed in detail.

Referring to FIG. 26, the projection arrangement 545 mounted on side 539 is viewable. The projection arrangement 545 includes a pair of projections 550, 551 mounted to project outwardly away from sheath 504. The particular arrangement depicted, projections 550, 551 are parallel ribs or ridges that project outwardly from a single integral base 553. The base 553 and projections 550, 551 may be secured to sheath 504 or may be formed integrally therewith. In the particular arrangement shown, FIG. 26, the base 553 and projections 550, 551 are integral with one another and comprise a pre-form secured to side 539.

Analogous to projections 68, 121, FIG. 6, projections 550, 551 are positioned to slide within receivers or grooves (preferably parallel and vertically extending) in a slide on a housing mounting arrangement, not shown in FIG. 26.

Preferably projection 550 is positioned adjacent to, but spaced from, inlet end secondary gasket 515. Preferably the distance of spacing is at least 6 mm, typically 10 to 20 mm. Although alternatives are possible, preferably projection 551 is positioned at least 60 mm, typically 100 to 150 mm, from projection 550. Typically and preferably projection 551 will be spaced substantially further from outlet end 506, then projection 550 is spaced from inlet end 505.

Attention is now directed to FIG. 27. In FIG. 27 a housing arrangement 560 is shown schematically. The view in FIG. 27 is toward an inlet end. The housing arrangement 560 comprises an outer wall arrangement 561 defining an interior 562. As with the embodiment of FIG. 6, typically the outer wall arrangement 561 has walls defining a rectangular cross-section (perpendicular to air flow) and includes a removable panel, typically a top panel 563, for removal and insertion of a serviceable filter cartridge 500, FIG. 26.

Figure 27A:
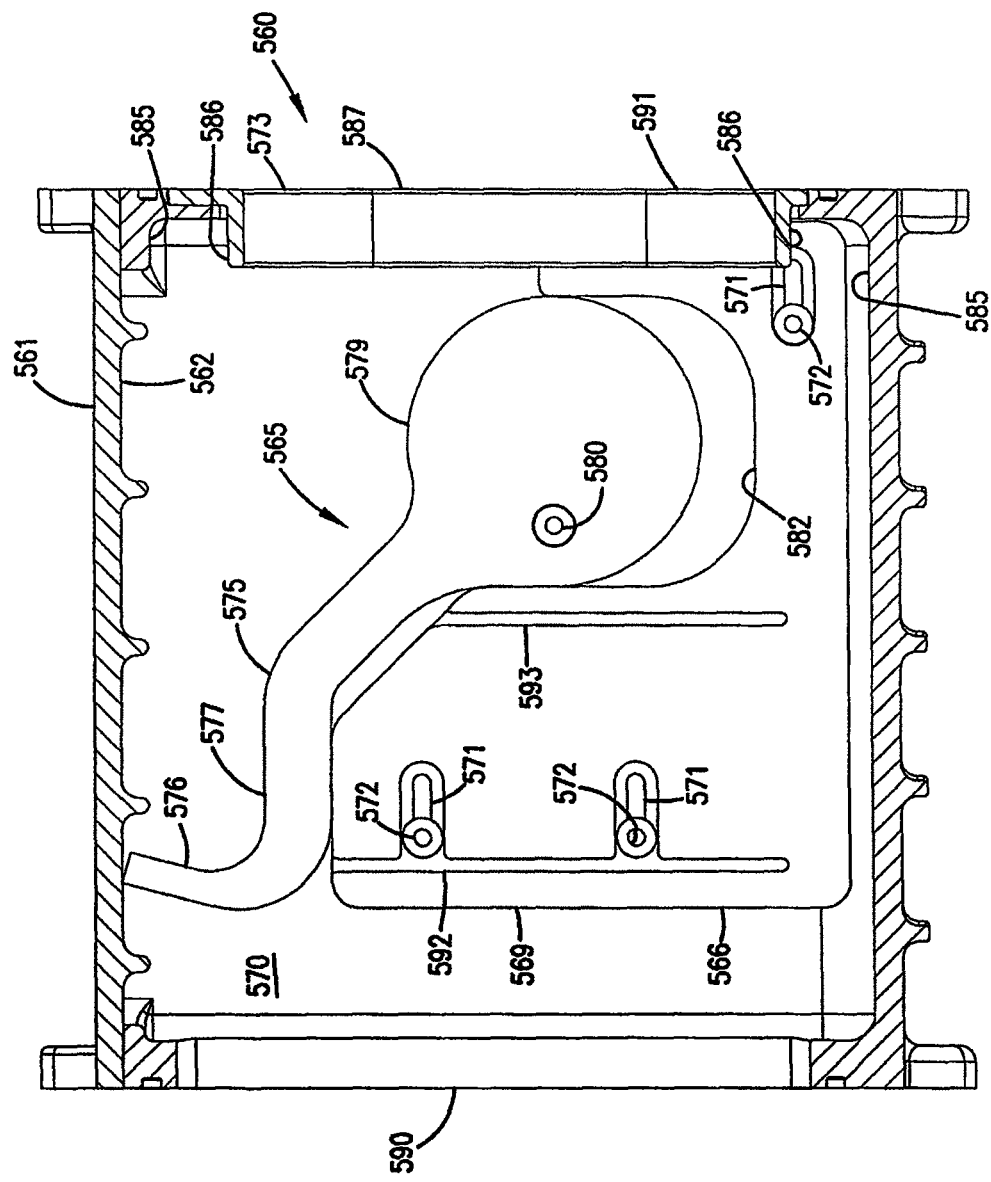
FIG. 27A is a cross-sectional view taken along line 27A-27A, FIG. 27.

FIG. 27A is a schematic cross-section taken generally along line 27A-27A, FIG. 27. In FIG. 27A, a portion of a biasing and lock arrangement 565 is viewable. It is noted that analogous components of a biasing and lock arrangement will be mounted as mirror images, on an opposite side wall of the housing arrangement 500.

Still referring to FIG. 27A, the biasing and lock mechanism 565 generally includes a slider construction 566. In this instance the slider construction 566 comprises first and second opposite slides mounted on opposite housing side walls as mirror images of one another. In FIG. 26, slide 569 is depicted. The slide 569 would be engageable by projection arrangement 545 mounted on side wall 539, of serviceable filter cartridge 500 in use.

The slide 569 is mounted for sliding motion on housing side wall 570, by slots 571 in engagement with pins 572. Although alternatives are possible, generally an amount of sliding motion (toward or away from end 573) of at least 10 mm, typically an amount within the range of 15 to 30 mm, will be preferred. For the particular arrangement shown, slide 569 is mounted by three slots 571, each of which is in sliding engagement with a selected one of three pins 572. It is noted that an alternate number of slots and pins could be used, but the particular number (3) provided is preferred.

The mounting and lock mechanism 565 further includes an actuator arrangement 575. The actuator arrangement comprises an operator handle 576 (analogous to handle 107, FIG. 7) in extension between opposite arms 577, only one of which is shown in FIG. 27A, the other being a mirror image. The arms 577 provide mechanical engagement to biasing members 579, only one of which is shown in FIG. 27A. Each of the biasing members 579 is mounted for eccentric rotation around a pivot point 580. Each biasing member 579 is positioned within an associated receiver slot 582 in an associated one of the slides 569. The arrangement is constructed such that when the handle member 576 is in a lower position, FIG. 27A, the slide 569 (and the opposite slide) will bias the filter cartridge 500 (not shown in FIG. 27A) into a sealing orientation, and, such that when the operator handle 576 is raised to an upper orientation, the slide 569 (and the opposite slide) will bias the serviceable filter cartridge 500 out of the sealing orientation and into a free position where it can be lifted out of the housing arrangement 560 and be replaced.

When used with serviceable filter cartridge 500, FIG. 26, the outside seal 522 would form against seal structure 585. When used with a serviceable filter cartridge having an inside radial seal, the seal would form against surface 586 of an optional insert structure 587, shown mounted in place for use and discussed below in connection with FIG. 29.

In general, the actuator arrangement 575 may operate analogously to the actuator arrangements described in connection with FIGS. 1-25. Some differences relate to the general direction of operation. In particular, for the arrangement of FIG. 27A, when the operator handle 576 is in a lower position, it is generally adjacent inlet end 590 of the housing arrangement 560; and when it is pivoted to the raised position, it is pivoted above the outlet end 591 of the housing arrangement 560. This is an opposite direction of rotation to that depicted for the embodiment of FIG. 6.

In addition, a preferred slide shape for slide 569, is shown in FIG. 27A. Instead of the tailed Y-shape of FIG. 9, the arrangement of FIG. 27A, uses a modification in which the lower side of the Y does not diverge, but rather it extends parallel to a base of the housing. For the particular arrangement shown, grooves 592, 593 for receipt of projections 550 and 551 respectively, are both positioned to a side of the pivot point 580 for the biasing member 579, toward the housing inlet end 590. That is, like the arrangement of FIG. 6 the pivot point 580 for the biasing member 579 associated with the slide 569, is not positioned between the grooves 592,593. However, unlike the embodiment of FIG. 6, for the preferred arrangement of FIG. 27A both grooves 592, 593 are located between the biasing member 579 and the housing inlet 590, instead of between the biasing member and the housing outlet end, FIG. 6.

The arm 577 is configured to accommodate a motion required by the operator handle 576 to cause desired operation and use.

Attention is now directed to FIG. 28. FIG. 28 depicts an alternate serviceable filter cartridge 600 to serviceable filter cartridge 500. In general, serviceable filter cartridge 600 is analogous to serviceable filter cartridge 500, except as now described. In particular, for serviceable filter cartridge 600 the primary seal arrangement 601 is constructed such that the seal surface 602 is positioned directed toward a central axis of the serviceable filter cartridge 600, instead of away from such an axis. Thus, seal surface 602 forms an inside radial seal, in this instance as having steps as indicated at 603, 604, with step 604 having a smaller outer perimeter size than step 603. The preferred seal surface 602 defines a parallelogram (preferably a rectangle) having four straight segments and four rounded corners. Each straight segment preferably extends, without curvature, for at least 10 mm, and typically substantially more.

Figure 29:
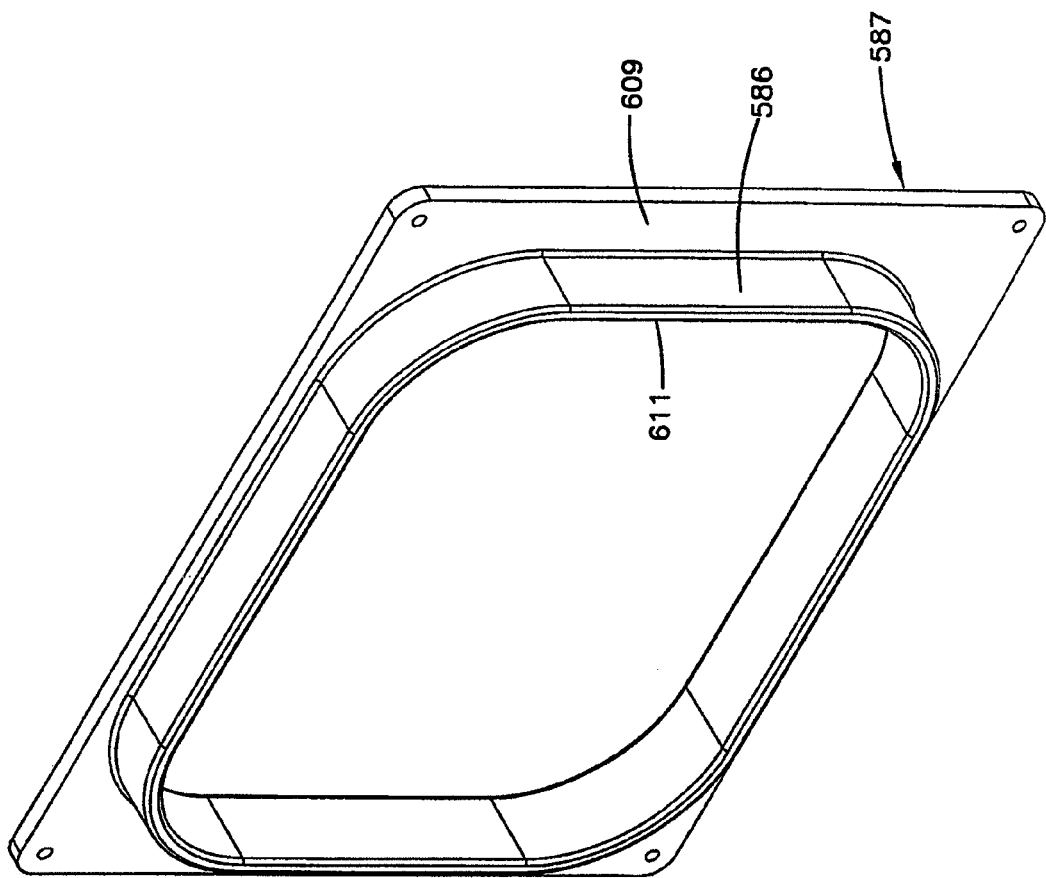
FIG. 29 is a perspective view of a rigid seal structure mountable on a housing and usable with a seal member of the element of FIG. 28.

A seal arrangement such as that depicted for serviceable filter cartridge 600 would need to engage a housing structure by being positioned around the outside of that housing structure, instead of circumscribed by that housing structure. An inside seal arrangement was described above in connection with FIGS. 12-14. Referring to FIG. 29, structure 587 includes an outer flange 609 by which it can be mounted to a remainder of a housing, as shown in FIG. 27A. The seal surface 586 around the outside of projection 611 is a seal surface against which the inside radial seal surface 602 of the primary seal arrangement 601 will be pressed, in use.

Both the arrangement of FIG. 26 and the arrangement of FIG. 28, use a uniquely configured radial seal having four straight sections with each pair of adjacent straight sections being separated by one of four curved, radiused, corners. The straight sections are generally configured as a four sided parallelogram with a first pair of opposite, parallel, sides and a second pair of opposite, parallel, sides. The particular parallelogram configuration shown in FIGS. 26, 28 for the seal region, is generally rectangular, with rounded corners.

While other seal configurations are possible using the principles of the present disclosure, a rectangular configuration as depicted is convenient and preferred for some applications.

A handle, for example, similar to that shown in FIG. 25, could be positioned on serviceable filter cartridge 500, 600 to ease carrying, installation and removal.

III. Concluding Observations

The present disclosure provides a variety of features that can be used in various combinations, to an advantage. In general, one result is the air cleaner arrangement which includes a housing as defined; and, filter cartridge positioned within the housing. The filter cartridge comprises Z-filter media construction using a fluted sheet secured to a facing sheet. The Z-filter media construction can be coiled or stacked to have opposite inlet and outlet flow faces. A sheath is positioned surrounding the Z-filter media; and a seal arrangement is positioned on the filter cartridge. In addition, a preferred projection arrangement is provided including projections extending outwardly from opposite sides of the sheath. The projection arrangement can be integral with a one piece plastic sheath.

In general terms, the filter cartridge is sized to be positioned in and to be removed from an interior of the housing that passes through the housing side wall when the access cover is removed. Inside the filter cartridge housing, the filter cartridge is positioned with the seal arrangement sealed to the housing with a rubber-like material pressed against the housing and preferably compressed in thickness as described. In addition, a portion of the air cleaner is provided in engagement with projections on the sheath, thereby axially driving the filter cartridge and axially pressing the seal arrangement against the housing. Several arrangements to accomplish this were provided as examples.

Preferably, the positioning and sealing of the filter cartridge in place, once inserted within the housing, is accomplished without any additional rotation of the filter cartridge, around a longitudinal axis extending therethrough. This is shown in the various examples, in which axial motion only is used to position the filter cartridge in a sealed position.

What is claimed is:
1. An air cleaner arrangement including:
(a) a housing having an air inlet and an air outlet, an interior, a sidewall enclosing the interior, an access opening through the sidewall, and a sealing surface;
(b) a filter cartridge installed in the interior of the housing, the filter cartridge comprising:
(i) an inlet flow end and an opposite outlet flow end so that air entering the air cleaner through the housing air inlet flows through the filter cartridge inlet flow end and then out the filter cartridge opposite outlet flow end and out of the air cleaner through the housing air outlet;
(ii) filter media constructed to filter air passing through the filter cartridge inlet flow end and the filter cartridge opposite outlet flow end;
(iii) a seal member sealing the filter cartridge to the housing along the housing sealing surface;
(iv) a structure extending from a first side of the filter cartridge and a structure extending from a second side of the filter construction, wherein the first side of the filter cartridge and the second side of the filter cartridge are opposite sides of the filter cartridge;
(v) the filter cartridge being positioned in the housing interior;
(vi) a handle construction comprising a portion located between the filter media and the access opening wherein the handle construction provides for removal of the filter cartridge through the access opening; and
(c) a slider construction that slides relative to the housing to bias the filter cartridge into a sealed position with the housing, wherein the slider construction comprises a first member that engages the structure extending from the first side of the filter cartridge and a second member that engages the structure extending from the second side of the filter construction.

2. An air cleaner arrangement according to claim 1 wherein:
(a) the slider construction locks the filter cartridge in the sealed position with the housing.

3. An air cleaner arrangement according to claim 1 wherein:
(a) the housing includes an access cover sized to close the access opening.

4. An air cleaner arrangement according to claim 3 wherein:
(a) the slider construction is not attached to the access cover.

5. An air cleaner arrangement according to claim 3 wherein:
(a) the slider construction biases the filter cartridge in the sealed position with the housing unless the access cover is removed from the access opening.

6. An air cleaner arrangement according to claim 1 wherein:
(a) the filter media comprises a fluted sheet secured to a facing sheet and provided in a coiled arrangement.

7. An air cleaner arrangement according to claim 1 wherein:
(a) the filter media comprises a fluted sheet secured to a facing sheet and provided in a stacked arrangement.

8. An air cleaner arrangement according to claim 6 wherein:
(a) the facing sheet is non-corrugated.

9. An air cleaner arrangement according to claim 1 wherein:
(a) the seal member is mounted on a seal support frame, wherein the seal support frame is provided around the media construction.

10. An air cleaner arrangement according to claim 9 wherein:
(a) the seal member is compressed between the seal support frame and the housing sealing surface.

11. An air cleaner arrangement according to claim 1 wherein:
(a) the seal member comprises polyurethane.

12. An air cleaner arrangement according to claim 1 wherein:
(a) the seal member forms a radially outwardly directed seal with the housing sealing surface.

13. An air cleaner arrangement according to claim 1 wherein:
(a) the seal member forms an axially directed seal with the housing sealing surface.

14. An air cleaner arrangement according to claim 1, the slider construction moves relative to a cam.

15. An air cleaner arrangement according to claim 1 wherein:
(a) the handle construction comprises a pair of cables.

16. An air cleaner arrangement according to claim 1 wherein:
(a) the handle construction comprises a bracket.

17. An air cleaner arrangement including:
(a) a housing having first and second opposite side walls, a third side wall extending between the first and second opposite side walls, an access cover opposite the third side wall and covering an access opening, an interior, and a sealing portion;
(b) a filter cartridge operably installed in the housing interior, the filter cartridge comprising:
(i) a first side facing the first housing side wall and a second side facing the second housing side wall;
(ii) filter media;
(iii) a frame piece extending around the filter media;
(iv) a seal member supported by the frame piece, wherein the seal member forms an axially directed seal with the housing sealing portion;
(v) a projection arrangement on the first side of the filter cartridge and a projection arrangement on the second side of the filter cartridge, wherein the projection arrangement on the first side of the filter cartridge and the projection arrangement on the second side of the filter cartridge are biased so that the seal member is compressed against the housing sealing portion to form a seal;
(c) a handle extending towards the access cover and constructed to allow a user to pull the handle and thereby remove the filter cartridge from the housing through the access opening when the access cover is removed; and
(d) the air cleaner is constructed so that the access cover can be separated from the housing without removing the filter cartridge from the housing interior.

18. An air cleaner arrangement according to claim 17 wherein:
(a) the filter media comprises a fluted sheet secured to a facing sheet and provided in a coiled arrangement.

19. An air cleaner arrangement according to claim 17 wherein:
a) the filter media comprises a fluted sheet secured to a facing sheet and provided in a stacked arrangement.

20. An air cleaner arrangement according to claim 17 wherein:
(a) the seal member comprises a rubber-like material.

21. An air cleaner arrangement according to claim 17 wherein:
(a) the seal member comprises a polyurethane material.

22. An air cleaner arrangement according to claim 17 wherein:
(a) the handle comprises a pair of cables.

23. An air cleaner arrangement according to claim 17 wherein:
(a) the housing comprises an air inlet end and an air outlet end.

24. An air cleaner arrangement according to claim 23 wherein:
(a) the housing seal portion is provided along the outlet end.

25. An air cleaner arrangement according to claim 17 wherein:
(a) the handle is attached to the air filter cartridge.

26. An air cleaner arrangement according to claim 17 further comprising:
(a) a biasing and lock mechanism that engages the projection arrangement on the first side of the filter cartridge and the projection arrangement on the second side of the filter cartridge to bias the filter cartridge in a direction to create a seal between the seal member and the housing sealing portion.

27. An air cleaner arrangement according to claim 26 wherein:
(a) the biasing and lock mechanism includes a portion that rotates between a locked position and a unlocked position so that when the biasing and lock mechanism is provided in a locked position, the seal is formed between the seal member and the housing sealing portion, and when the biasing and lock mechanism is provided in a unlocked position, the filter cartridge can be removed through the housing from the access opening when the access cover is removed.

28. An air filter cartridge according to claim 27 wherein:
(a) the access cover can be installed on the access opening when the filter cartridge is present within the housing interior only when the biasing and lock mechanism is provided in the locked position.

29. An air cleaner arrangement according to claim 17 wherein:
(a) the seal member is molded to the frame piece.

30. An air cleaner arrangement according to claim 17 wherein:
(a) the filter cartridge has a generally rectangular cross-section and curved corners.

\* \* \* \* \*